(12) United States Patent
Buscema

(10) Patent No.: US 8,521,668 B2
(45) Date of Patent: Aug. 27, 2013

(54) MODEL FOR RECONSTRUCTING A CAUSATION PROCESS FROM TIME VARYING DATA DESCRIBING AN EVENT AND FOR PREDICTING THE EVOLUTION DYNAMICS OF THE EVENT

(75) Inventor: Paolo Massimo Buscema, Rome (IT)

(73) Assignees: CSI Ricerca e Ambiente SRL, Rome (IT); Semeion Centro Ricerche, Rome (IT)

( * ) Notice: Subject to any disclaimer, the term of this patent is extended or adjusted under 35 U.S.C. 154(b) by 393 days.

(21) Appl. No.: 13/070,854

(22) Filed: Mar. 24, 2011

(65) Prior Publication Data

US 2012/0246101 A1 Sep. 27, 2012

(51) Int. Cl.
*G06N 3/00* (2006.01)
*G06F 17/10* (2006.01)

(52) U.S. Cl.
USPC .......................................................... 706/13

(58) Field of Classification Search
USPC .......................................................... 706/13
See application file for complete search history.

(56) References Cited

U.S. PATENT DOCUMENTS 5,276,770 A * 1/1994 Castelaz ........................ 706/25

* cited by examiner

Primary Examiner — Jeffrey A Gaffin
Assistant Examiner — Ola Olude Afolabi
(74) Attorney, Agent, or Firm — Themis Law

(57) ABSTRACT

A method of reconstructing a causation process from time varying data describing an event, the data consisting in a certain number of entities each having a position in a space, and each of the entities being characterized by at least a quantity or value relatively to at least one feature and in the quantity or value relatively to at least one of the features of the entities at least at two different times or at each time instant of a sequence of time instants;

the method describing the higher likelihood transition of all entities i, j from the time n to the time n+1 as a function of the position coordinate of the entity I and of the entity j and the quantity of the at least one feature of the entity I and of the entity j at the time n and at the time n+1:

$$M_{i,j}^{[n,n+1]} = \psi(x_i, y_i, q_i^{[n]}, q_i^{[n+1]}, x_j, y_j, q_j^{[n]}, q_j^{[n+1]}).$$

the function determining the strength of the connection between each entity i at time n and each other entity j at time n+1;

the method determining the source causing changes in quantity of the entity j from the time n to the time n+1 as the entity i for which the strength of connection is a maximum.

The invention relates also to a method of predicting the evolution dynamics of an event or process starting from the information about the causation process obtained from the above function.

15 Claims, 25 Drawing Sheets

| Entities | X | Y | Time (1) | Time (2) | Time (3) | Time (...) | Time (N) |
|---|---|---|---|---|---|---|---|
| Entity (1) | Ex(1) | Ey(1) | q(1,1) | q(1,2) | q(1,3) | q(1,...) | q(1,N) |
| Entity (2) | Ex(2) | Ey(2) | q(2,1) | q(2,2) | q(2,3) | q(2,...) | q(2,N) |
| Entity (3) | Ex(3) | Ey(3) | q(3,1) | q(3,2) | q(3,3) | q(3,...) | q(3,N) |
| Entity (4) | Ex(4) | Ey(4) | q(4,1) | q(4,2) | q(4,3) | q(4,...) | q(4,N) |
| Entity (5) | Ex(5) | Ey(5) | q(5,1) | q(5,2) | q(5,3) | q(5,...) | q(5,N) |
| Entity (6) | Ex(6) | Ey(6) | q(6,1) | q(6,2) | q(6,3) | q(6,...) | q(6,N) |
| Entity (7) | Ex(7) | Ey(7) | q(7,1) | q(7,2) | q(7,3) | q(7,...) | q(7,N) |
| Entity (8) | Ex(8) | Ey(8) | q(8,1) | q(8,2) | q(8,3) | q(8,...) | q(8,N) |
| Entity (...) | Ex(...) | Ey(...) | q(...,1) | q(...,2) | q(...,3) | q(...,...) | q(...,N) |
| Entity (M) | Ex(M) | Ey(M) | q(M,1) | q(M,2) | q(M,3) | q(M,...) | q(M,N) |

Fig. 1

| Data | Quantity at n=0 | Quantity at n=1 | Quantity at n=2 |
|---|---|---|---|
| Place 1 | 0 | 0 | 5 |
| Place 2 | 0 | 0 | 2 |
| Place 3 | 0 | 4 | 0 |
| Place 4 | 1 | 3 | 7 |
| Place 5 | 1 | 1 | 4 |

| Transf_1->2 | | | |
|---|---|---|---|
| Source | TRF | Destination | Strength |
| Place_4 | -> | Place_3 | 1.000000 |
| Place_5 | -> | Place_4 | 0.016203 |
| Place_4 | -> | Place_5 | 0.008928 |

Fig. 5

| Transf_2->3 | | | |
|---|---|---|---|
| Source | TRF | Destination | Strength |
| Place_3 | -> | Place_1 | 0.010040 |
| Place_4 | -> | Place_2 | 0.005317 |
| Place_3 | -> | Place_4 | 1.000000 |
| Place_3 | -> | Place_5 | 0.072003 |

Fig. 6

| Presence of Connections between places (Row = Time (n) - Columns= Time(n+1)) | | | | | |
|---|---|---|---|---|---|
| n=0; n=1 | Place 1 | Place 2 | Place 3 | Place 4 | Place 5 |
| Place 1 | 0 | 0 | 0 | 0 | 0 |
| Place 2 | 0 | 0 | 0 | 0 | 0 |
| Place 3 | 0 | 0 | 0 | 0 | 0 |
| Place 4 | 0 | 0 | 1 | 0 | 1 |
| Place 5 | 0 | 0 | 0 | 1 | 0 |

| Presence of Connections between places (Row = Time (n) - Columns= Time(n+1)) | | | | | |
|---|---|---|---|---|---|
| n=1; n=2 | Place 1 | Place 2 | Place 3 | Place 4 | Place 5 |
| Place 1 | 0 | 0 | 0 | 0 | 0 |
| Place 2 | 0 | 0 | 0 | 0 | 0 |
| Place 3 | 1 | 0 | 0 | 1 | 1 |
| Place 4 | 0 | 1 | 0 | 0 | 0 |
| Place 5 | 0 | 0 | 0 | 0 | 0 |

Step 1 (n=0 -> n=1)

Step 2 (n=1 -> n=2)

Step 1 & 2 (n=0 -> n=1 ->n=2)

| Data | Quantity at n=0 | Quantity at n=1 | Quantity at n=2 | Quantity at n=3 | Quantity at n=4 |
|---|---|---|---|---|---|
| Place 1 | 0 | 0 | 5 | 4 | 1 |
| Place 2 | 0 | 0 | 2 | 3 | 2 |
| Place 3 | 0 | 4 | 0 | 2 | 1 |
| Place 4 | 1 | 3 | 7 | 5 | 3 |
| Place 5 | 1 | 1 | 4 | 4 | 2 |

New observations: Quantity at n=3, Quantity at n=4

Fig. 15

| Presence of Connections between places | | | | | |
|---|---|---|---|---|---|
| n=0; n=1 | Place 1 | Place 2 | Place 3 | Place 4 | Place 5 |
| Place 1 | 0 | 0 | 0 | 0 | 0 |
| Place 2 | 0 | 0 | 0 | 0 | 0 |
| Place 3 | 0 | 0 | 0 | 0 | 0 |
| Place 4 | 0 | 0 | 1 | 0 | 1 |
| Place 5 | 0 | 0 | 0 | 1 | 0 |

| Presence of Connections between places | | | | | |
|---|---|---|---|---|---|
| n=1; n=2 | Place 1 | Place 2 | Place 3 | Place 4 | Place 5 |
| Place 1 | 0 | 0 | 0 | 0 | 0 |
| Place 2 | 0 | 0 | 0 | 0 | 0 |
| Place 3 | 1 | 0 | 0 | 1 | 1 |
| Place 4 | 0 | 1 | 0 | 0 | 0 |
| Place 5 | 0 | 0 | 0 | 0 | 0 |

| Presence of Connections between places | | | | | |
|---|---|---|---|---|---|
| n=2; n=3 | Place 1 | Place 2 | Place 3 | Place 4 | Place 5 |
| Place 1 | 0 | 1 | 0 | 0 | 0 |
| Place 2 | 0 | 0 | 0 | 0 | 0 |
| Place 3 | 0 | 0 | 0 | 0 | 0 |
| Place 4 | 1 | 0 | 1 | 0 | 1 |
| Place 5 | 0 | 0 | 0 | 1 | 0 |

| Presence of Connections between places | | | | | |
|---|---|---|---|---|---|
| n=3; n=4 | Place 1 | Place 2 | Place 3 | Place 4 | Place 5 |
| Place 1 | 0 | 1 | 0 | 0 | 0 |
| Place 2 | 1 | 0 | 0 | 0 | 0 |
| Place 3 | 0 | 0 | 0 | 1 | 1 |
| Place 4 | 0 | 0 | 1 | 0 | 0 |
| Place 5 | 0 | 0 | 0 | 0 | 0 |

| Strength of Connections between places | | | | | |
|---|---|---|---|---|---|
| n=0; n=1 | Place 1 | Place 2 | Place 3 | Place 4 | Place 5 |
| Place 1 | 0.000000 | 0.000000 | 0.000000 | 0.000000 | 0.000000 |
| Place 2 | 0.000000 | 0.000000 | 0.000000 | 0.000000 | 0.000000 |
| Place 3 | 0.000000 | 0.000000 | 0.000000 | 0.000000 | 0.000000 |
| Place 4 | 0.000000 | 0.000000 | 1.000000 | 0.000000 | 0.098928 |
| Place 5 | 0.000000 | 0.000000 | 0.089095 | 0.016203 | 0.000000 |

| Strength of Connections between places | | | | | |
|---|---|---|---|---|---|
| n=1; n=2 | Place 1 | Place 2 | Place 3 | Place 4 | Place 5 |
| Place 1 | 0.000000 | 0.000000 | 0.000000 | 0.000000 | 0.000000 |
| Place 2 | 0.000000 | 0.000000 | 0.000000 | 0.000000 | 0.000000 |
| Place 3 | 0.010040 | 0.002334 | 0.000000 | 1.000000 | 0.072903 |
| Place 4 | 0.006473 | 0.005317 | 0.000000 | 0.000000 | 0.010714 |
| Place 5 | 0.000994 | 0.000029 | 0.000000 | 0.005165 | 0.000000 |

| Strength of Connections between places | | | | | |
|---|---|---|---|---|---|
| n=2; n=3 | Place 1 | Place 2 | Place 3 | Place 4 | Place 5 |
| Place 1 | 0.000000 | 0.040726 | 0.009736 | 0.020922 | 0.010910 |
| Place 2 | 0.021721 | 0.000000 | 0.001697 | 0.012889 | 0.000238 |
| Place 3 | 0.000000 | 0.000000 | 0.000000 | 0.000000 | 0.000000 |
| Place 4 | 0.029657 | 0.034255 | 1.000000 | 0.000000 | 0.058438 |
| Place 5 | 0.006683 | 0.000273 | 0.050911 | 0.025251 | 0.000000 |

| Strength of Connections between places | | | | | |
|---|---|---|---|---|---|
| n=3; n=4 | Place 1 | Place 2 | Place 3 | Place 4 | Place 5 |
| Place 1 | 0.000000 | 0.067575 | 0.013630 | 0.031244 | 0.010560 |
| Place 2 | 0.016218 | 0.000000 | 0.003564 | 0.028870 | 0.000345 |
| Place 3 | 0.004362 | 0.004752 | 0.000000 | 0.948148 | 0.072407 |
| Place 4 | 0.010545 | 0.040599 | 1.000000 | 0.000000 | 0.040402 |
| Place 5 | 0.004277 | 0.000582 | 0.091640 | 0.048482 | 0.000000 |

Fig. 16

|  | | Input Variables | | | | | | Target Variables | | | | |
|---|---|---|---|---|---|---|---|---|---|---|---|---|
| Place & Time | | n | | | | | | n+1 | | | | |
| | | Place 1(n) | Place 2(n) | Place 3(n) | Place 4(n) | Place 5(n) | > | Place 1(n+1) | Place 2(n+1) | Place 3(n+1) | Place 4(n+1) | Place 5(n+1) |
| Place 1 | n=0 | 0 | 0 | 0 | 0 | 0 | > | 0 | 0 | 0 | 0 | 0 |
| Place 2 | n=0 | 0 | 0 | 0 | 0 | 0 | > | 0 | 0 | 0 | 0 | 0 |
| Place 3 | n=0 | 0 | 0 | 1 | 0 | 0 | > | 1 | 0 | 0 | 1 | 1 |
| Place 4 | n=0 | 0 | 0 | 0 | 1 | 1 | > | 0 | 1 | 0 | 0 | 0 |
| Place 5 | n=0 | 0 | 0 | 0 | 0 | 0 | > | 0 | 1 | 0 | 0 | 0 |
| Place 1 | n=1 | 0 | 0 | 0 | 0 | 0 | > | 0 | 0 | 0 | 0 | 0 |
| Place 2 | n=1 | 1 | 0 | 0 | 0 | 1 | > | 0 | 0 | 0 | 0 | 1 |
| Place 3 | n=1 | 0 | 1 | 0 | 1 | 0 | > | 1 | 0 | 1 | 1 | 0 |
| Place 4 | n=1 | 0 | 0 | 0 | 0 | 0 | > | 0 | 0 | 0 | 0 | 0 |
| Place 5 | n=1 | 0 | 0 | 0 | 0 | 1 | > | 0 | 1 | 0 | 0 | 0 |
| Place 1 | n=2 | 0 | 1 | 0 | 0 | 0 | > | 1 | 0 | 0 | 1 | 0 |
| Place 2 | n=2 | 0 | 0 | 0 | 0 | 0 | > | 0 | 0 | 0 | 0 | 0 |
| Place 3 | n=2 | 0 | 0 | 1 | 1 | 0 | > | 0 | 0 | 1 | 0 | 1 |
| Place 4 | n=2 | 1 | 0 | 0 | 0 | 1 | > | 0 | 0 | 0 | 0 | 0 |
| Place 5 | n=2 | 0 | 0 | 0 | 0 | 0 | > | 0 | 0 | 0 | 0 | 0 |
| Place 1 | n=3 | 0 | 1 | 0 | 0 | 0 | > | ? | ? | ? | ? | ? |
| Place 2 | n=3 | 1 | 0 | 0 | 0 | 1 | > | ? | ? | ? | ? | ? |
| Place 3 | n=3 | 0 | 0 | 0 | 1 | 0 | > | ? | ? | ? | ? | ? |
| Place 4 | n=3 | 0 | 0 | 1 | 0 | 0 | > | ? | ? | ? | ? | ? |
| Place 5 | n=3 | 0 | 0 | 0 | 0 | 0 | > | ? | ? | ? | ? | ? |

Fig. 18

Training set / Tuning set / Blind Testing set / Prediction set

| Blind Test | | Place(n+1) 1 | Place(n+1) 2 | Place(n+1) 3 | Place(n+1) 4 | Place(n+1) 5 | |
|---|---|---|---|---|---|---|---|
| Place(n) 1 | | 0 | 1 | 0 | 0 | 0 | Real |
| | | 0 | 1 | 1 | 0 | 0 | Estimation |
| Place(n) 2 | | 1 | 0 | 0 | 0 | 0 | Real |
| | | 0 | 0 | 0 | 0 | 0 | Estimation |
| Place(n) 3 | | 0 | 0 | 0 | 1 | 1 | Real |
| | | 1 | 0 | 0 | 1 | 1 | Estimation |
| Place(n) 4 | | 0 | 0 | 1 | 0 | 0 | Real |
| | | 0 | 0 | 0 | 0 | 0 | Estimation |
| Place(n) 5 | | 0 | 0 | 0 | 0 | 0 | Real |
| | | 0 | 0 | 0 | 0 | 0 | Estimation |

Light grey= Missing Connections
Dark grey= False Connections

Fig. 19

| Results | Rights | Total | % |
|---|---|---|---|
| Sensitivity | 3 | 5 | 60.00% |
| Specificity | 18 | 20 | 90.00% |
| Accuracy | 21 | 25 | 84.00% |

Fig. 20

| ID | Place Name | Lat and Long | | Number of new subjects infected at each step | | | | | | | Total |
|---|---|---|---|---|---|---|---|---|---|---|---|
| | | Y | X | n=0 | n=1 | n=2 | n=3 | n=4 | n=5 | n=6 | |
| 1 | POPULINA | -50.5300 | -19.9500 | 0 | 0 | 0 | 0 | 19 | 12 | 1 | 32 |
| 2 | OUROESTE | -50.3700 | -20.0000 | 0 | 0 | 2 | 6 | 5 | 0 | 0 | 13 |
| 3 | INDIAPORA | -50.2900 | -19.9800 | 0 | 0 | 0 | 0 | 5 | 0 | 0 | 5 |
| 4 | PAULO_DE_FARIA | -49.3800 | -20.0300 | 1 | 30 | 67 | 43 | 40 | 14 | 1 | 196 |
| 5 | CARDOSO | -49.9100 | -20.0800 | 1 | 1 | 4 | 2 | 4 | 1 | 0 | 13 |
| 6 | RIOLANDIA | -49.6800 | -19.9900 | 1 | 2 | 11 | 38 | 24 | 9 | 2 | 87 |
| 7 | TURMALINA | -50.4700 | -20.0500 | 0 | 0 | 0 | 0 | 1 | 0 | 0 | 1 |
| 8 | MACEDONIA | -50.1900 | -20.1400 | 0 | 0 | 0 | 2 | 3 | 1 | 0 | 6 |
| 9 | DOLCINOPOLIS | -50.5100 | -20.1200 | 0 | 0 | 0 | 0 | 0 | 1 | 0 | 1 |
| 10 | PEDRANOPOLIS | -50.1100 | -20.2400 | 0 | 0 | 2 | 0 | 0 | 0 | 0 | 2 |
| 11 | FERNANDOPOLIS | -50.2400 | -20.2800 | 0 | 11 | 73 | 205 | 201 | 35 | 17 | 542 |
| 12 | ESTRELA D'OESTE | -50.4000 | -20.2800 | 0 | 1 | 0 | 3 | 2 | 2 | 0 | 8 |
| 13 | S._FE_DO_SUL | -50.9200 | -20.2100 | 0 | 0 | 0 | 5 | 5 | 1 | 1 | 12 |
| 14 | JALES | -50.5400 | -20.2600 | 0 | 1 | 5 | 16 | 4 | 1 | 0 | 27 |
| 15 | GUARACI | -48.9400 | -20.4900 | 0 | 0 | 1 | 6 | 4 | 0 | 0 | 11 |
| 16 | AMERICO_DE_CAMPOS | -49.7300 | -20.2900 | 0 | 0 | 0 | 0 | 1 | 0 | 0 | 1 |
| 17 | ICEM | -49.1900 | -20.3400 | 0 | 0 | 0 | 1 | 3 | 0 | 2 | 6 |
| 18 | COSMORAMA | -49.7700 | -20.4700 | 0 | 0 | 0 | 2 | 4 | 3 | 1 | 10 |
| 19 | NOVA_GRANADA | -49.3100 | -20.5300 | 0 | 0 | 1 | 3 | 4 | 0 | 0 | 8 |
| 20 | MERIDIANO | -50.1700 | -20.3500 | 0 | 0 | 0 | 1 | 0 | 0 | 0 | 1 |
| 21 | VOTUPORANGA | -49.9700 | -20.4200 | 2 | 4 | 9 | 7 | 10 | 3 | 4 | 39 |
| 22 | TANABI | -49.6400 | -20.6200 | 0 | 0 | 0 | 0 | 12 | 5 | 1 | 18 |
| 23 | APARECIDA_D'OESTE | -50.8800 | -20.4400 | 0 | 0 | 1 | 0 | 0 | 0 | 0 | 1 |
| 24 | GENERAL_SALGADO | -50.3600 | -20.6400 | 0 | 0 | 0 | 7 | 17 | 3 | 1 | 28 |
| 25 | AURIFLAMA | -50.5500 | -20.6800 | 0 | 0 | 0 | 0 | 3 | 0 | 0 | 3 |
| 26 | IPIGUA | -49.3800 | -20.6500 | 0 | 0 | 0 | 0 | 4 | 0 | 0 | 4 |
| 27 | OLIMPIA | -48.9100 | -20.7300 | 1 | 8 | 55 | 242 | 356 | 98 | 12 | 772 |
| 28 | MONTE_APRAZIVEL | -49.7100 | -20.7700 | 0 | 0 | 6 | 20 | 18 | 18 | 0 | 62 |
| 29 | GUAPIACU | -49.2200 | -20.7900 | 0 | 0 | 1 | 2 | 5 | 2 | 2 | 12 |
| 30 | BALSAMO | -49.5800 | -20.7300 | 0 | 0 | 0 | 0 | 0 | 2 | 0 | 2 |
| 31 | SAO_JOSE_DO_RIO_PRETO | -49.3700 | -20.8200 | 30 | 142 | 583 | 2002 | 2781 | 690 | 188 | 6416 |
| 32 | POLONI | -49.8200 | -20.7800 | 0 | 0 | 0 | 2 | 12 | 9 | 3 | 26 |
| 33 | MIRASSOL | -49.5200 | -20.8100 | 2 | 21 | 171 | 550 | 618 | 159 | 44 | 1565 |
| 34 | MACAUBAL | -49.9600 | -20.8000 | 0 | 0 | 0 | 1 | 2 | 2 | 0 | 5 |
| 35 | SEVERINIA | -48.8000 | -20.8000 | 0 | 0 | 0 | 1 | 4 | 0 | 0 | 5 |
| 36 | NEVES_PAULISTA | -49.6300 | -20.8400 | 0 | 0 | 0 | 13 | 32 | 11 | 2 | 58 |
| 37 | UCHOA | -49.1700 | -20.9500 | 0 | 0 | 0 | 0 | 2 | 6 | 2 | 10 |
| 38 | TABAPUA | -49.0300 | -20.9600 | 10 | 23 | 7 | 6 | 3 | 2 | 0 | 51 |
| 39 | CAJOBI | -48.8000 | -20.8800 | 2 | 2 | 84 | 179 | 39 | 1 | 0 | 307 |
| 40 | CEDRAL | -49.2600 | -20.9000 | 0 | 0 | 0 | 0 | 3 | 2 | 1 | 6 |
| 41 | JACI | -49.5700 | -20.8800 | 0 | 0 | 1 | 5 | 6 | 2 | 0 | 14 |
| 42 | BADY_BASSITT | -49.4400 | -20.9100 | 0 | 0 | 1 | 8 | 11 | 6 | 2 | 28 |
| 43 | EMBAUBA | -48.8300 | -20.9800 | 0 | 0 | 0 | 1 | 1 | 0 | 0 | 2 |
| 44 | JOSE_BONIFACIO | -49.6800 | -21.0500 | 0 | 0 | 1 | 20 | 15 | 9 | 6 | 51 |
| 45 | IBIRA | -49.2400 | -21.0800 | 0 | 0 | 0 | 0 | 1 | 0 | 0 | 1 |
| 46 | POTIRENDABA | -49.3700 | -21.0400 | 0 | 0 | 0 | 0 | 1 | 5 | 1 | 7 |
| 47 | CATANDUVA | -48.9700 | -21.1300 | 0 | 0 | 14 | 38 | 43 | 14 | 2 | 111 |
| 48 | CATIGUA | -49.0500 | -21.0400 | 0 | 1 | 20 | 41 | 6 | 1 | 0 | 69 |
| 49 | PALM._PAULISTA | -48.8000 | -21.0800 | 0 | 0 | 0 | 1 | 1 | 0 | 0 | 2 |
| 50 | URUPES | -49.2900 | -21.2000 | 0 | 0 | 0 | 0 | 7 | 2 | 0 | 9 |
| 51 | IRAPUA | -49.4000 | -21.2700 | 0 | 0 | 2 | 0 | 1 | 0 | 0 | 3 |
| 52 | ADOLFO | -49.6400 | -21.2300 | 0 | 0 | 0 | 1 | 1 | 0 | 0 | 2 |
| 53 | SANTA_ADELIA | -48.8000 | -21.2400 | 0 | 0 | 0 | 1 | 3 | 0 | 0 | 4 |
| 54 | ITAJOBI | -49.0500 | -21.3100 | 0 | 0 | 0 | 1 | 0 | 0 | 0 | 1 |

Fig. 24

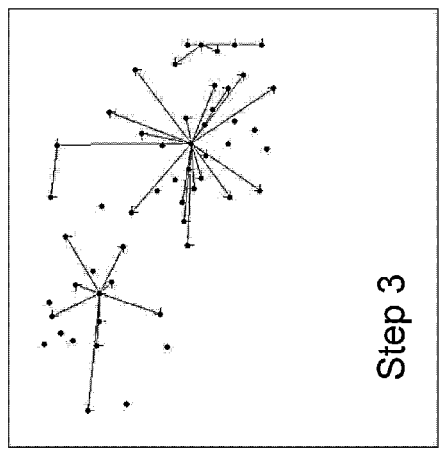
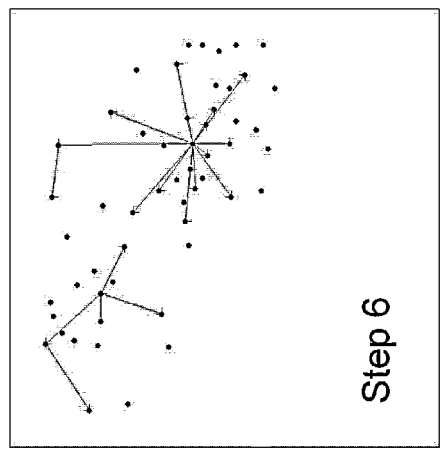
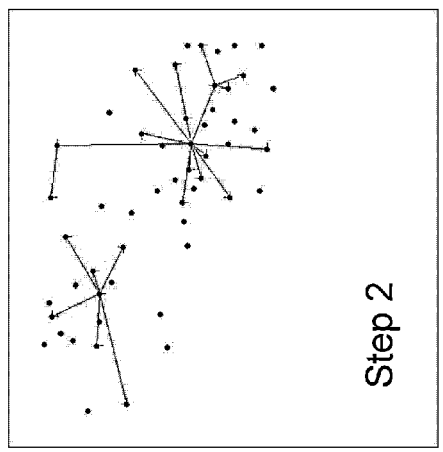
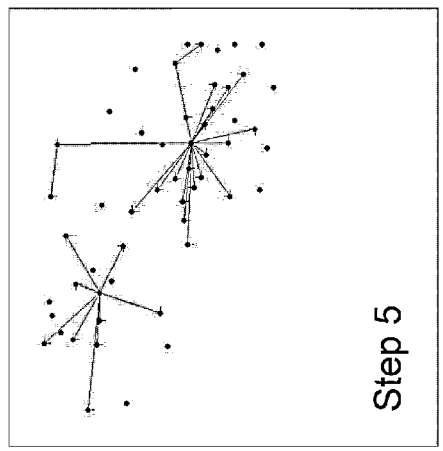
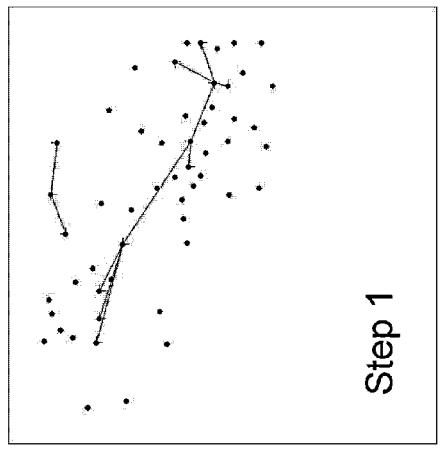
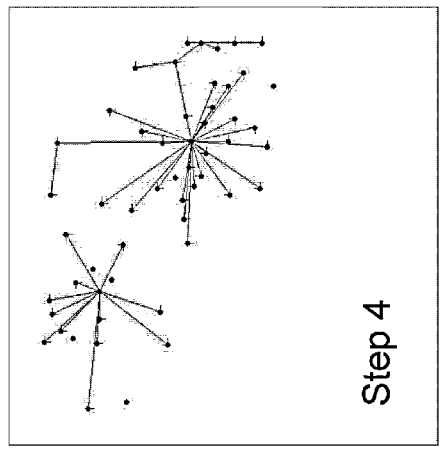
Fig. 26

| TDM Algorithm | |
|---|---|
| Working Hypothesis | 378 |
| Right Connections | 183 |
| Missing Connections | 3 |
| Sensitivity | 98.39% |
| Specificity | 100.00% |
| Global Accuracy | 99.21% |

Learning : steps (0->1) (1->2) (2->3) (3->4)
Blind Testing : step (4->5)

| Testing | Corrects | Total | Errors | % |
|---|---|---|---|---|
| Sensitivity | 31 | 34 | 3 | 91.18% |
| Precision | 2866 | 2882 | 16 | 99.44% |
| Accuracy | 2897 | 2916 | 19 | 99.35% |

Learning : steps (0->1) (1->2) (2->3) (3->4) (4->5)
Blind Testing : step (5->6)

| Testing | Corrects | Total | Errors | % |
|---|---|---|---|---|
| Sensitivity | 19 | 22 | 3 | 86.36% |
| Precision | 2881 | 2894 | 13 | 99.55% |
| Accuracy | 2900 | 2916 | 16 | 99.45% |

Learning : steps (0->1) (1->2) (2->3) (3->4) (4->5) (5->6)
Blind Testing : step (6->7) ?

MODEL FOR RECONSTRUCTING A CAUSATION PROCESS FROM TIME VARYING DATA DESCRIBING AN EVENT AND FOR PREDICTING THE EVOLUTION DYNAMICS OF THE EVENT

FIELD OF THE INVENTION

The invention relates to a method for reconstructing a causation process from time varying data describing an event and for predicting the evolution dynamics of the event.

Particularly the invention relates to models for an event or process to be described by entities, which can be represented as points in a space and which are characterized by at least one feature represented by a time varying, measurable quantity or value.

According to a further specific application of the invention, the event or process is described by entities which can be represented by points in a two dimensional space, such as a map, each entity being characterized by at least one feature having a value or quantity that is time varying.

BACKGROUND OF THE INVENTION

Typical events or processes are the events or processes occurring in a geophysical territory, the territory being described by a two or three dimensional geometrical map, the entities being points representing places in the map.

The reconstruction of a causation process from time varying data describing an event or process and for predicting the evolution dynamics of the event or process has a great technical importance in may technical fields. Practically, if considering a control logic of a system or a plant, several parameters can be measured at different locations and at different times.

A certain condition of operation of such a system can be analyzed relating to the causation processes which have brought to the condition by means of a method according to the present invention. Furthermore, a prediction of the evolutionary dynamics based on the entities and on the time varying quantities measured for one or more features of the entity may allow the evaluation of the future evolutions of the system and taking necessary measures in order to influence this evolution either positively or negatively.

In artificial intelligence systems, as robotized devices or the like, the possibility that systems or robotized devices can carry out cognitive processes on measured or else acquired or inputted data has also a very relevant importance for enhancing the capabilities of such systems or devices. The machine operating with artificial intelligence will be able to determine the causation process and predict further developments of a real scenario starting from the measured positions of a given number of entities on a map which represents the real world scenario and on the quantities measured for each entity for one or more features of the entities at different times. The information so determined can be used for allowing the system or device to take decisions on the data (entities and time varying quantities related to each one of the entity) and to execute actions or start processes in response to the scenario represented by the entities and the related quantities.

This kind of technology enhances the power of artificial intelligence in evaluating events or processes and in taking decisions about actions or operations to be carried out basing on the evaluation of data acquired by measuring physical or chemical parameters of a certain environment, which can be represented in a two dimensional map as entities having time varying quantities or values of one or more features of the entities.

Events or processes but also devices, plants or control systems can be described by physical and/or chemical parameters. These parameters relate to the condition of the event, of the process or of the device, of the plant or the control system and/or to the functional or evolution steps which will be carried out as a response to certain status conditions. Thus, it is clear that a space can be constructed representing the event, the process or the device, the plant, the control system in relation to certain status or functional parameters. The status or functional behavior or the evolution of the event or the process can be so described by means of a topographic representation.

Similarly considering a device or a plant or a control system, these have a two or three dimensional structure which can be described by functional or constructive schemes, in which single operative units or organs are represented and their connections, so that the behavior of the system, of the device or of the plant can be represented by the changes in the status or functional parameters of the single operative units or organs. The plant, the device or system has already a topographic structure relating to the positions of the operative units which could serve as a space for representing the system. Here the entities are the operative units or organs and the quantities related to one or more features of each entity are the numerical values of one or more parameters describing the operative condition of a certain entity.

In alternative to the above, the space to be used is a space defined by a certain number of status or functional parameters of a certain number of operative organs or units, in which a point in this space represents a status condition or a functional condition at a certain time of a certain operative unit or organ. When the status or functional conditions changes in time the point representing the status and/or functional condition of a certain operative unit or organ changes its place in the space.

Consider for example a system, in which the status condition of each organ or unit provided in the system is defined by a P, V and T (Pressure, Volume, Temperature) parameters. A map of the system can be constructed, in which each unit or organ has a certain fixed position and the status or functional condition of each unit or organ is described by the measured values at certain different time instants of the physical parameters P, V and T. The present invention aims to giving an objective answer to the questions: which change in the operative condition of which entity has influenced which other entity and in which way relative to its operative condition, and furthermore, knowing the history of the operative condition of each entity up to a certain time, how will the system develop in future times and how will develop the operative conditions of the operative units of the system.

If the system has a great number of operative organs or units, it is a very high burden to answer to the above questions.

SUMMARY OF THE INVENTION

The object of the present invention is to provide a method of reconstructing a causation process from time varying data describing an event and of predicting the evolution dynamics of the event.

The above aim is achieved with a method of reconstructing a causation process from time varying data describing an event, the data consisting in a certain number of entities each having a position in a space, and each of the entities being characterized by at least a quantity or value relatively to at least one feature and in the quantity or value relatively to at least one of the features of the entities at least at two different times or at each time instant of a sequence of time instants;

the method describing the higher likelihood transition of all entities i, j from the time n to the time n+1 as a function of the position coordinate of the entity I and of the entity j and the quantity of the at least one feature of the entity I and of the entity j at the time n and at the time n+1:

$$M_{i,j}^{[n,n+1]} = \psi(x_i, y_i, q_i^{[n]}, q_i^{[n+1]}, x_j, y_j, q_j^{[n]}, q_j^{[n+1]}).$$

the function determining the strength of the connection between each entity i at time n and each other entity j at time n+1;

the method determining the source causing changes in quantity of the entity j from the time n to the time n+1 as the entity i for which the strength of connection is a maximum.

According to a further feature, the method is applied for each step from a time n to a time n+1 of the value of at least one quantity determined at each time instant of a sequence of time instants.

According to still a further improvement for each time step from time n to time n+1, a data matrix is generated in which each element is the strength of the connection of each entity i at time n to each entity j at time n+1.

According to a further improvement, from a data matrix of the strength of the connections a data matrix of the presence of a directed link is generated in which each element represents the presence value 1 or absence value 0 of a connection between en entity I at time n and an entity j at time n+1 and in which the value 0 or 1 is given by determining the maximum strength among the strength of connection of each one of the entities i and one entity j.

More precisely, the strength of the connection between a so called source entity i at time n and a destination or target entity j at time n+1 is determined according to the following function:

$$S_{i,j}^{[n,n+1]} = q_i^{[n]} \cdot q_j^{[n+1]} \cdot e^{-\frac{d_{i,j}}{\alpha}} \cdot \frac{1 + (q_i^{[n+1]} - q_i^{[n]})}{1 + (q_j^{[n+1]} - q_j^{[n]})}; q \in [0, 1]$$

where:
- $q_i^{[n]}$, $q_i^{[n+1]}$ are respectively the quantity in source place (entity i) at time n and the quantity inn source place (entity i) at time n+1;
- $q_j^{[n]}$, $q_j^{[n+1]}$ are respectively the quantity in destination place (entity j) at time n and the quantity in destination place (entity j) at time n+1;
- $d_{i,j}$ is the distance between the source (entity i) and the destination (entity j) in the space or map;
- $\alpha$ is a tuned parameter connected to distance; and
- $S_{i,j}^{[n,n+1]}$ is the strength of directed connection between source (entity i) at time n and destination (entity j) at time n+1.

A matrix of the strength of connection can be constructed from the data of the strength of connection obtained from equation $S_{i,j}^{[n,n+1]}$.

The selection of the strongest connection for determining which source entity i has caused the changes in the quantity of the destination entity j in the time step from time n to time n+1 is determined as follows from $$S_{i,j}^{[n,n+1]}$$

$$S_{Win,j}^{[n,n+1]} = \text{ArgMax}\{S_{i,j}^{[n,n+1]}\}$$

where:

ArgMax is the maximum of the argument of the function $S_{i,j}^{[n,n+1]}$ and $S_{Win,j}^{[n,n+1]}$ determines this maximum among the strength of connection of the source entities i for each different destination entity j. The entity I for which the strength of connection $S_{i,j}^{[n,n+1]}$ is maximum to a certain entity j is considered as the entity by which the event at entity j determining the changes in the value of the quantity at entity j from time n to time n+1 has been caused.

From $S_{Win,j}^{[n,n+1]}$ a numerical value of presence/absence of a directed link between a source entity I at time n and a destination entity j at time n+1 can be determined by the following equations:

$$\begin{cases} C_{i,j}^{[n,n+1]} = 1 & i = Win; \\ C_{i,j}^{[n,n+1]} = 0 & i \neq Win; \end{cases}$$

The definition Win relates to the ith entity for which the equation $S_{Win,j}^{[n,n+1]} = \text{ArgMax}\{S_{i,j}^{[n,n+1]}\}$ is valid.

$C_{i,j}^{[n,n+1]}$ is defined as the function indicating the presence of a link between a source entity I at time n and a destination entity j at time n+1.

Similarly to the strength of the connections, for the presence of the links a matrix can be generated from the values $C_{i,j}^{[n,n+1]}$ which matrix has values 1 for the elements I, j for which the entity i satisfying the equation $S_{Win,j}^{[n,n+1]} = \text{ArgMax}\{S_{i,j}^{[n,n+1]}\}$ for a destination entity j and zero values for all the entities i for which the equation is not true.

According to still a further improvement, the results of the above equations, which are limited to the discrete entities i, j provided in the database and have a certain position in a map, can be extended to the entire map by determining out of the values $S_{i,j}^{[n,n+1]}$ a scalar field.

This scalar field defines the potential influence on the process or event of each place (entity) overall the global surface of the map.

In a two dimensional map, where each entity has a position defined by a pair of coordinates (x, y) the equation $$I_{i_{x,y}}^{[n,n+1]} = \sum_{j}^{M} S_{i,j}^{[n,n+1]}$$

defines the potential influence of the i-th entity overall the global surface of the map, and the equation $$CI_{i_{x,y}} = \sum_{n}^{N} \sum_{j}^{M} S_{i,j}^{[n]}$$

defines the cumulative potential Influence of the i-th assigned entity overall the global surface, where:

M is the number of the assigned entities; and

N is the number of time steps (Delta times) of the sequence of time instants from the first to the last time instant of the sequence.

The potentiality (U) of each point of the surface to influence the other point of the surface of the map and to be influenced is determined by the following equation:

$$U_{k_{x,y}}^{[n,n+1]} = \sum_i^M e^{-\frac{D(E_{i_{x,y}}, P_{k_{x,y}})}{\alpha}} \cdot I_{i_{x,y}}^{[n,n+1]}$$

where:
- D(.) is the distance of a generic k-th point P from the i-th entity (E) in the map;
- M is the number of entities E;
- $E_{i_{x,y}}$ is the i-th entity E with the coordinate x, y in the map; and
- $P_{k_{x,y}}$ is the k-th point P in the map with the coordinate x, y in the map.

According to a further feature, the present method may be applied for predicting the evolution dynamics of the event or process starting from the information about the causation process.

In this case the method for predicting the evolution dynamics of the event or process comprises the following steps:

providing data which data consist in a certain number of entities each one having a position in a space, and each one of the entities being characterized by at least a quantity or value relatively to at least one feature, the data comprising for each of the entity i, j and for at least one of the features the quantity or value $q_i$ at different time instants n of a sequence of time instants comprising N time steps;

determining for each step from one time instant n to the following time instant n+1 in the sequence of time instants the matrix of the strength of connections $S_{i,j}^{[n,n+1]}$ from a source entity i at time n to a destination entity j at time n+1 and the connection matrix $C_{i,j}^{[n,n+1]}$, i.e. the matrix of absence or presence of a link between a source entity i at time n and a destination entity j at time n+1;

generating a new dataset by joining the data of the connection matrix $C_{i,j}^{[n,n+1]}$ of all the N time steps of the sequence of time instants;

training a predictive algorithm with at least part of the data of the new dataset; and determining the quality of the entities as source entities i at a first time instant at which the quality or value of the at least one feature is known for destination entities j at a following future time instant by feeding the known data at the first time instant to the trained predictive algorithm.

Using a more strength mathematical formalism the above can be expressed as follows:

the new dataset is generated by joining an rewriting the connection matrices $C_{i,j}^{[n,n+1]}$ with a moving windows, where each connection vector x of each place P of the entity at the time n points out to the connection vector x of the same place P at time n+1:

$$\text{new Dataset: } \{\{\vec{x}_n^p, \vec{x}_{n+1}^p\}_{n=0}^{N-1}\}_{p=1}^P$$

where:
- P is the number of places where the entities are
- N is the number of time steps According to a particular embodiment the predictive algorithm is a Artificial Neural Network ANN with the following model:

$$x(n) \rightarrow x(n+1) = f(x(n), w^*) + \epsilon$$

where:
- w* is the weight matrix of the trained Artificial Neural Network, which approximate the optimal parameters to model the global temporal process obtained by the known connection matrices $C_{i,j}^{[n,n+1]}$ so defining the local laws of the process itself According to an improvement a special way to use the new dataset for training and testing the predictive algorithm, i.e. the artificial neural network is chosen which consist in the fact that, for training set and testing set each record is composed by P+1 input variables consisting in:

the connectivity values (1/0) of each place from the time (n) to the time (n+1) according to the corresponding connection matrix $C_{i,j}^{[n,n+1]}$, and the connectivity values (1/0) of each place from the time (n+1) to the time (n+2) according to the corresponding connection matrix $C_{i,j}^{[n+1,n+2]}$, while none of the sets has the same input vector but a different target vector.

BRIEF DESCRIPTION OF THE DRAWINGS

FIG. 1 is a table illustrating the data of a database of a first example of problem to which the method of the present invention can be applied for reconstructing a causation process from the time varying data describing a unknown process dynamics and for predicting the evolution dynamics of the event.

FIGS. 5 and 6 illustrates a possible way of representing the causation process as tables of numerical data and connections between entities respectively for the first and for the second time steps, i.e. from instant zero to 1 and from instant 1 to 2.

FIG. 15 shows the table of data for a further database of entities and time varying quantities of the entities at five different time defining four time steps.

FIG. 16 illustrates the tables relating to the strength of connection among the entities and the tables relating to the presence absence of connection among the entities at each one of the four time steps provided in the data represented by the table of FIG. 15.

FIG. 18 is a table representing the new database obtained by the joining of the four table s of connection according to FIG. 16 and an example of distribution of the records of the database for carrying out an experiment comprising training, tuning blind testing and predicting with a predictive algorithm, specifically an artificial neural network, which prediction should determine the unknown evolution of the process or event starting from the knowledge of the quantity data for the entities at a number of preceding time step.

FIG. 19 is a table comparing the results of the estimation carried out by the predictive algorithm with the real data on presence/absence of connection for the places considered and the time step considered for prediction in the experiment according to FIG. 18.

FIG. 20 is a table of the sensitivity, specificity and accuracy value of the prediction.

FIG. 24 illustrates the table of data from which the graphic representation of FIG. 23 has been generated.

FIG. 26 illustrates the graphical representations of the causation process for six following time steps relatively to the data of FIG. 24.

DETAILED DESCRIPTION OF THE INVENTION

Referring to FIG. 1, the illustrated table is a scheme of the structure of typical data for which the present method can be used for reconstructing a causation process and for predicting future evolution.

The present example is limited to a two dimensional case but the process may be also extended to a three dimensional or n dimensional case.

The structure of the data comprises entities having stable positions in a map. This means constant coordinates in time.

Each entity is further characterized by a feature which changes in time and can be represented by a quantity such as a numerical value. The data of the quantity is provided at least for two, generally for a certain number of time instants of a sequence of time instants.

Starting from the knowledge of this kind of data the question to which the method according to the present invention gives an answer is how to reconstruct the global causation process.

This causation process can be defined also as the information about which entity provided in the data at a certain time (n) influences which other of the entities at the time (n+1) causing the variation of the quantity observed. Furthermore is also relevant to determine the strength of the influence.

As it will be seen in the following description, the further improvement step of the method according to the present invention is also to determine the invariants of the causation process and thus be able to predict which of the entities at a certain time (n) will influence which other entities at the time (n+1) in a blind way, i.e. without knowing the data at the time (n+1).

The method according to the present invention is explained in the following according to different examples.

Example I

Figures 2, 3:
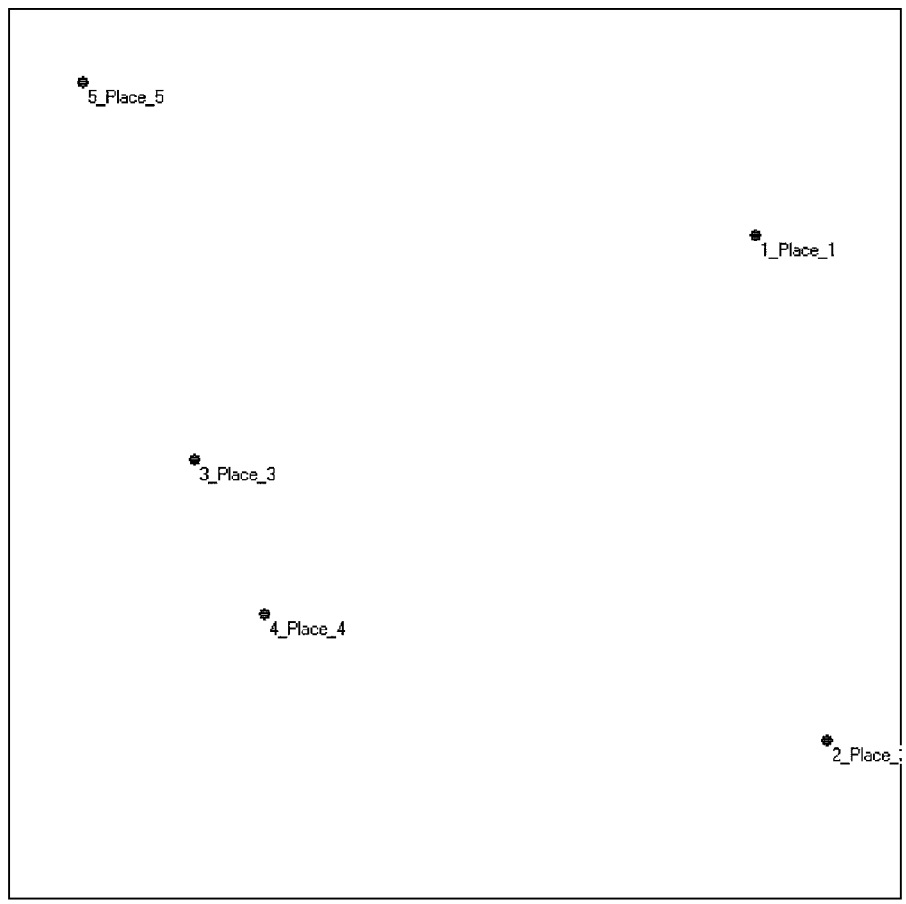
FIG. 2 illustrates a second example to which the present method is applied in a table containing the numerical data as in FIG. 1.
FIG. 3 illustrates the map in which the entities of the data of FIG. 2 are drawn as points.

Example 1 is based on the data reported in the table of FIG. 2. The entities are in the form of five places (place 1 to place 5) for which the coordinate are known in a two dimensional map. For each of the places a quantity corresponding to a certain feature related to the places and representing a certain process or event is provided in numerical value form and for three different time instants of sequence of time instants. The time instants are defined as time n=0, time n=1 and time n=2. The places are placed in a map illustrated in FIG. 3 and the position of the places in the map is determined by using their coordinates.

Starting from the data of FIG. 2, the causation process is then reconstructed by considering each time step separately: the first time steps from time n=0 to time n=1 and the second time step from time n=1 and time n=2.

For both time steps the strength of the connection between each place 1 to 5 versus each other of the places 1 to 5 is determined by means of the following equation:

$$S_{i,j}^{[n,n+1]} = q_i^{[n]} \cdot q_j^{[n+1]} \cdot e^{-\frac{d_{i,j}}{\alpha}} \cdot \frac{1 + (q_i^{[n+1]} - q_i^{[n]})}{1 + (q_j^{[n+1]} - q_j^{[n]})}; q \in [0, 1]$$

where:
- $q_i^{[n]}$, $q_i^{[n+1]}$ are respectively the quantity in source place (entity i) at time n and the quantity inn source place (entity i) at time n+1;
- $q_j^{[n]}$, $q_j^{[n+1]}$ are respectively the quantity in destination place (entity j) at time n and the quantity in destination place (entity j) at time n+1;
- $d_{i,j}$ is the distance between the source (entity i) and the destination (entity j) in the space or map;
- $\alpha$ is a tuned parameter connected to distance; and
- $S_{i,j}^{[n,n+1]}$ is the strength of directed connection between source (entity i) at time n and destination (entity j) at time n+1.

A matrix of the strength of connection can be constructed from the data of the strength of connection obtained from equation $S_{i,j}^{[n,n+1]}$.

Figure 4:
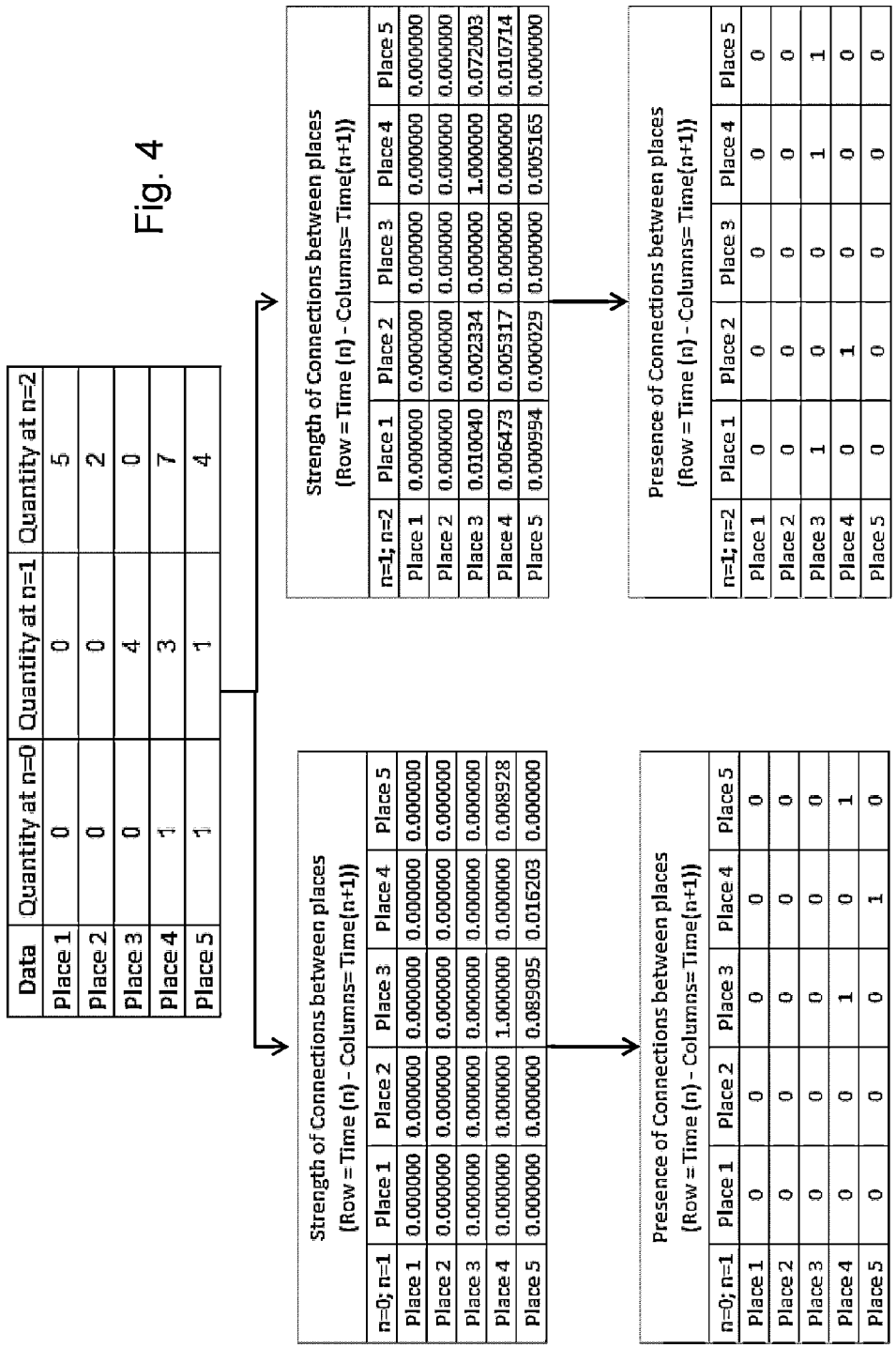
FIG. 4 illustrates the tables relatively to the strength of connections $S_{i,j}^{[n,n+1]}$ between the entities and the presence of connections $C_{i,j}^{[n,n+1]}$ for the data of FIG. 2 calculated according to the present method and for the two time steps for which the quantities data are provided in table of FIG. 2.

In FIG. 4 the flux of the reconstruction process is illustrated starting from the data of FIG. 2 and for both the time steps defined above. The first line of tables below the starting data represents the matrix of the strength of connections between the places considered at source entities at time n (rows) and the places considered as destinations at time n+1 (columns).

Once the data is available, for each time step and for each place as source entity the maximum strength value is determined and this is taken as an indication that a direct link is present for the place representing the source entity and the place representing the destination entity for which the strength of connection is a maximum.

These steps are carried out applying to the data of FIG. 2 and for each time step the following steps:

$$S_{Win,j}^{[n,n+1]} = \text{ArgMax}\{S_{i,j}^{[n,n+1]}\}$$

where:
ArgMax is the maximum of the argument of the function $S_{i,j}^{[n,n+1]}$ and $S_{Win,j}^{[n,n+1]}$ determines this maximum among the strength of connection of the source entities i for each different destination entity j.

The entity I for which the strength of connection $S_{i,j}^{[n,n+1]}$ is maximum to a certain entity j is considered as the entity by which the event at entity j determining the changes in the value of the quantity at entity j from time n to time n+1 has been caused.

From $S_{Win,j}^{[n,n+1]}$ a numerical value of presence/absence of a directed link between a source entity I at time n and a destination entity j at time n+1 can be determined by the following equations:

$$\begin{cases} C_{i,j}^{[n,n+1]} = 1 & i = \text{Win;} \\ C_{i,j}^{[n,n+1]} = 0 & i \neq \text{Win;} \end{cases}$$

The definition Win relates to the ith entity for which the equation $S_{Win,j}^{[n,n+1]} = \text{ArgMax}\{S_{i,j}^{[n,n+1]}\}$ is valid.

$C_{i,j}^{[n,n+1]}$ is defined as the function indicating the presence of a link between a source entity I at time n and a destination entity j at time n+1.

Similarly to the strength of the connections, the presence of the links a matrix can be generated from the values $C_{i,j}^{[n,n+1]}$, which matrix has values 1 for the elements I, j for which the entity i satisfying the equation $S_{Win,j}^{[n,n+1]} = \text{ArgMax}\{S_{i,j}^{[n,n+1]}\}$ for a destination entity j zero values for all the entities i for which the equation is not true.

In the above indicated equations the term entity corresponds in the present example to the places 1 to 5.

The matrix of connections for the two time steps is reported in FIG. 4 in the last line. As it appears clearly for each place 1 to 5 considered as a source entity the maximum values of the strength of connection $S_{Win,j}^{[n,n+1]}$ are determined so that the matrix of connection is formed by "0" or "1" indicating respectively absence and presence of a direct link between the place considered as a source entity and the place considered as the destination entity.

From the matrix of connections it appears that in the first time step from time instant n=0 to time instant n=1, the source entity Place 4 has caused a variation of the quality at the destination entities Place 3 and Place 5 and the source entity Place 5 has caused a variation of the quality for the destination entity Place 4. All the other places are not involved in the causation process of the evolution of the event in the time step 1.

In the second time step from n=1 to n=2, the connection matrix indicates as source entity place3 which has caused a variation of the quality at the destination entities place1, place4 and place5 and place4 which has caused a variation of the quality for the destination entity place2.

In FIGS. 5 and 6 the results are represented as a first transfer step from a status 1 at time n=0 to a status 2 at time n=1 and as a second transfer step from a status 2 at time n=1 to a status 3 at time n=2.

The tables indicate the time step to which the data refer. In the left column there is indicated the source entity, in the following column the direction and in the third column the destination entity on which the source entity has a direct link, i.e. has cause the variation in the monitored quantity from tine n to time n+1. The last right column indicates the strength of the connection between the source and the destination entity.

So if considering the table of FIG. 5, the source entity place 3 at time n=0 has caused the variation of the quantity at the value of time n=1 of the destination entity Place 3, similarly the source entity Place 5 has caused the variation of the quantity at the value of time n=1 of the destination entity Place 4, which Place 4 is as the same time source entity influencing the quantity at time n+1 of the destination entity Place 5. The strength of the influence for each couple of source and destination entity is given in the right column as a numerical parameter.

In the table of FIG. 6, the results are that in the second time step, the source entity Place 3 at time n=1 has caused the variation of the quantity at the value of time n=2 of the destination entity Place 1, similarly the source entity Place 4 has caused the variation of the quantity at the value of time n=2 of the destination entity Place 2. The source entity Place 3 has also influenced the quantity at time n=2 of the destination entities Place 4 and Place 5.

The right column indicates the strength of the influence for each couple of source and destination entity.

Figures 7, 8:
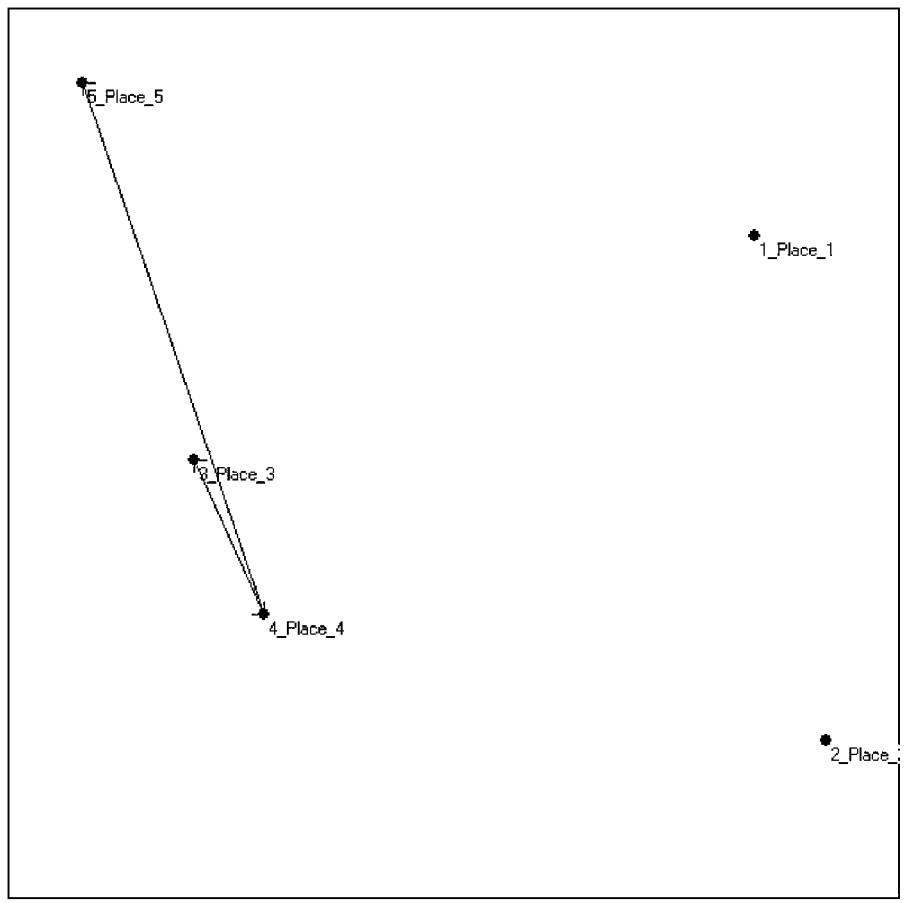
FIGS. 7 and 8 illustrate respectively the table of the presence absence of connection for the first time step and the graphic representation of the connection in the map with entities as arrows connecting the entities between which a connection is present.

FIG. 7 represents the matrix of connection among the 5 places as source entities and the five places as destination entities at the first time step from time n=0 to time n=1. FIG. 8 is a graphic representation of the connection matrix with vectors connecting the source entities and the corresponding destination entities for which a direct link is present according to connection matrix of FIG. 7. Since for the two entities Place 4 and 5 the situation is that they are alternatively source and destination entities of each other, there is only a line for which the arrow changes direction depending on the source entity considered.

Figures 9, 10:
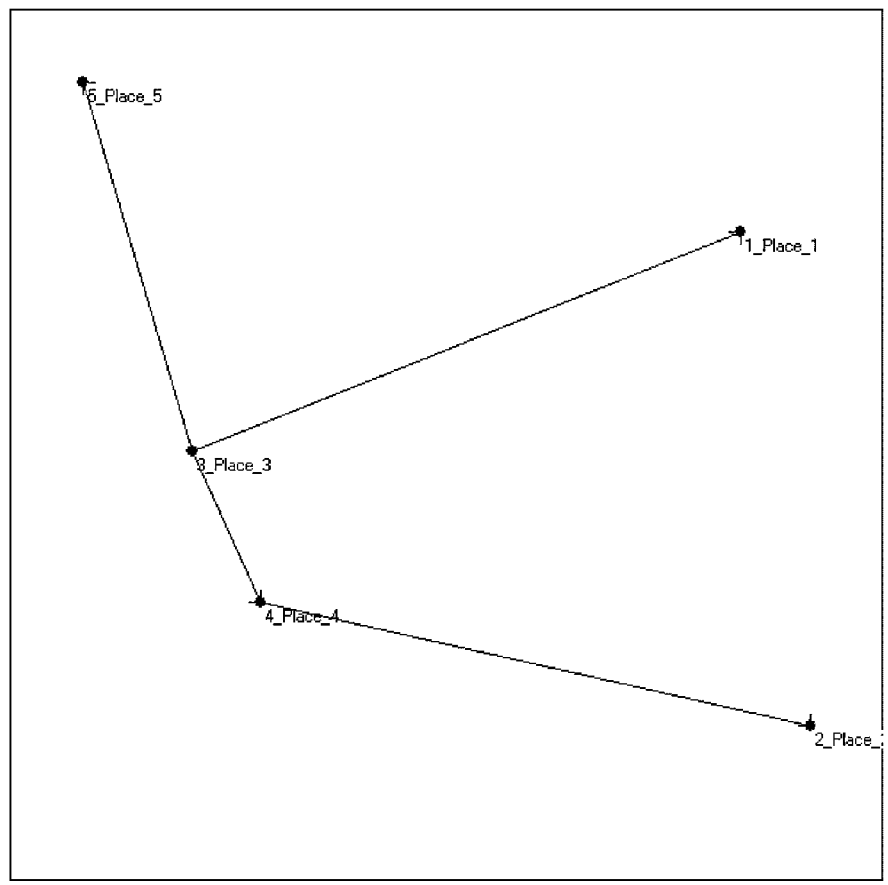
FIGS. 9 and 10 illustrate respectively the table of the presence absence of connection for the second time step and the graphic representation of the connection in the map with entities as arrows connecting the entities between which a connection is present.

FIG. 9 represents the matrix of connection among the five places as source entities and the five places as destination entities at the first time step from time n=1 to time n=2.

FIG. 10 is a graphic representation of the connection matrix with vectors connecting the source entities and the corresponding destination entities for which a direct link is present according to connection matrix of FIG. 9.

Figure 11:
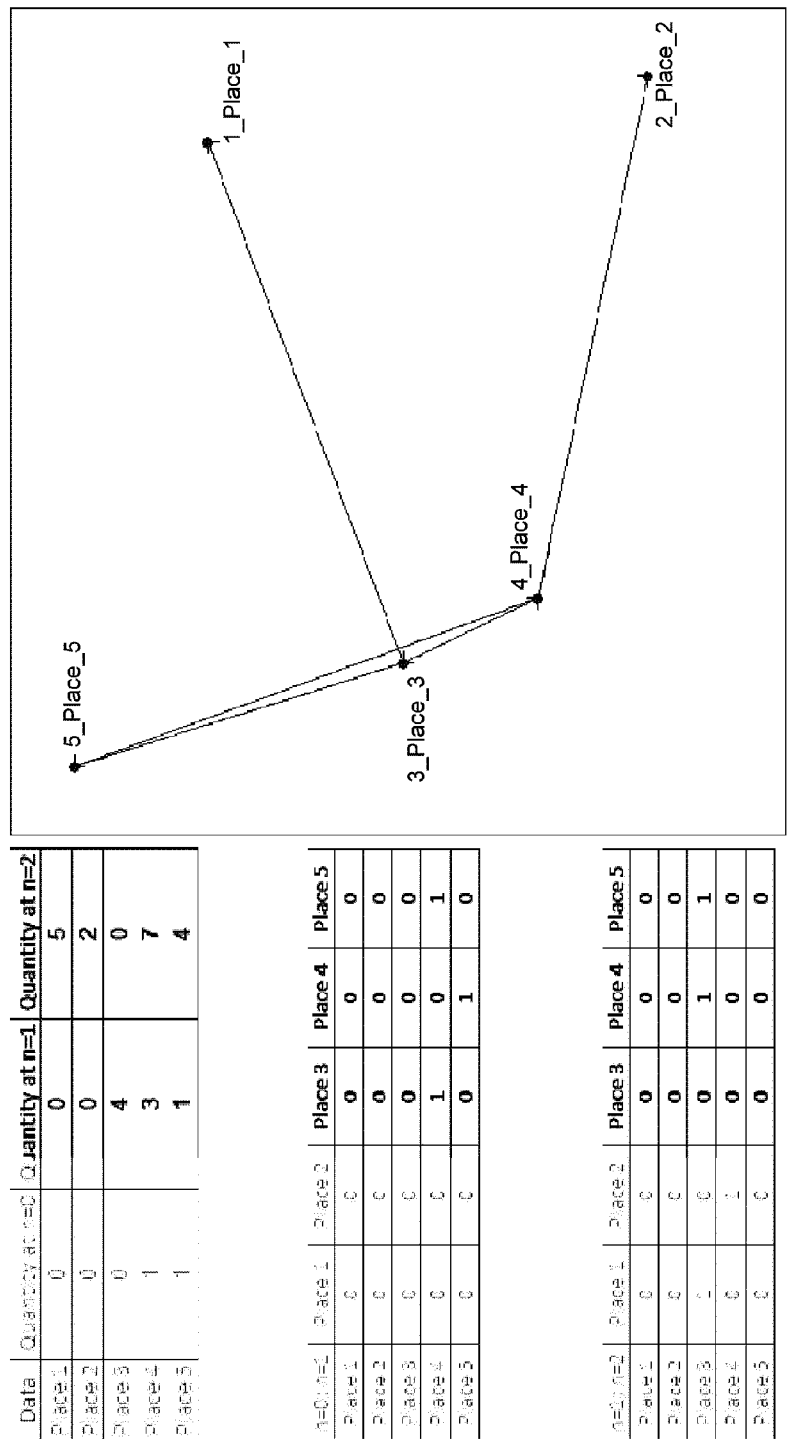
FIG. 11 illustrates the table of the starting data, the taw o table of connections for the time steps 1 and 2 and the graphic representation in which the graphic representations of the step 1 and step 2 according to FIGS. 8 and 10 are overlapped.

In FIG. 11, on the left hand side there are shown the table of the data, i.e. the entities and the corresponding quantities at the time n=0, n=1 and n=2, the connection matrix for the first time step from time n=0 to n=1 and the connection matrix for the second time step from tine n=1 to n=2.

The right hand graphic representation corresponds to the graphic representations of FIGS. 8 and 10 overlapped one on the other.

Starting from the data of the computed strength of connection between the source entities and the destination entities at a time step and to the corresponding connection matrix, it is possible to extend the reconstruction of the causation process over the entire plane by determining scalar field.

The scalar field represents the potential influence on the process or event of each place (entity) overall the global surface of the map.

The following formalism is used to determine the scalar field in a map, which field represents the potentiality (U) of each point of the surface of the map to influence the other points of the surface of the map and to be influenced.

In a two dimensional map, where each entity has a position defined by a pair of coordinates (x, y) the equation $$I_{i_{x,y}}^{[n,n+1]} = \sum_{j}^{M} S_{i,j}^{[n,n+1]}$$

defines the potential influence of the i-th entity overall the global surface of the map, and the equation $$CI_{i_{x,y}} = \sum_{n}^{N} \sum_{j}^{M} S_{i,j}^{[n]}$$

defines the cumulative potential Influence of the i-th entity over the entire global surface, where:
  M is the number of the assigned entities, and
  N is the number of time steps (Delta times) of the sequence of time instants from the first to the last time instant of the sequence.

The potentiality (U) of each point of the surface to influence the other point of the surface of the map and to be influenced can be determined using the following equation:

$$U_{k_{x,y}}^{[n,n+1]} = \sum_{i}^{M} e^{-\frac{D(E_{i_{x,y}}, P_{k_{x,y}})}{\alpha}} \cdot I_{i_{x,y}}^{[n,n+1]}$$

where:
  D(.) is the distance of a generic k-th point P from the i-th entity (E) in the map;
  M is the number of entities E;
  $E_{i_{x,y}}$ is the i-th entity E with the coordinate x, y in the map; and
  $P_{k_{x,y}}$ is the k-th point P in the map with the coordinate x, y in the map.

Figure 12:
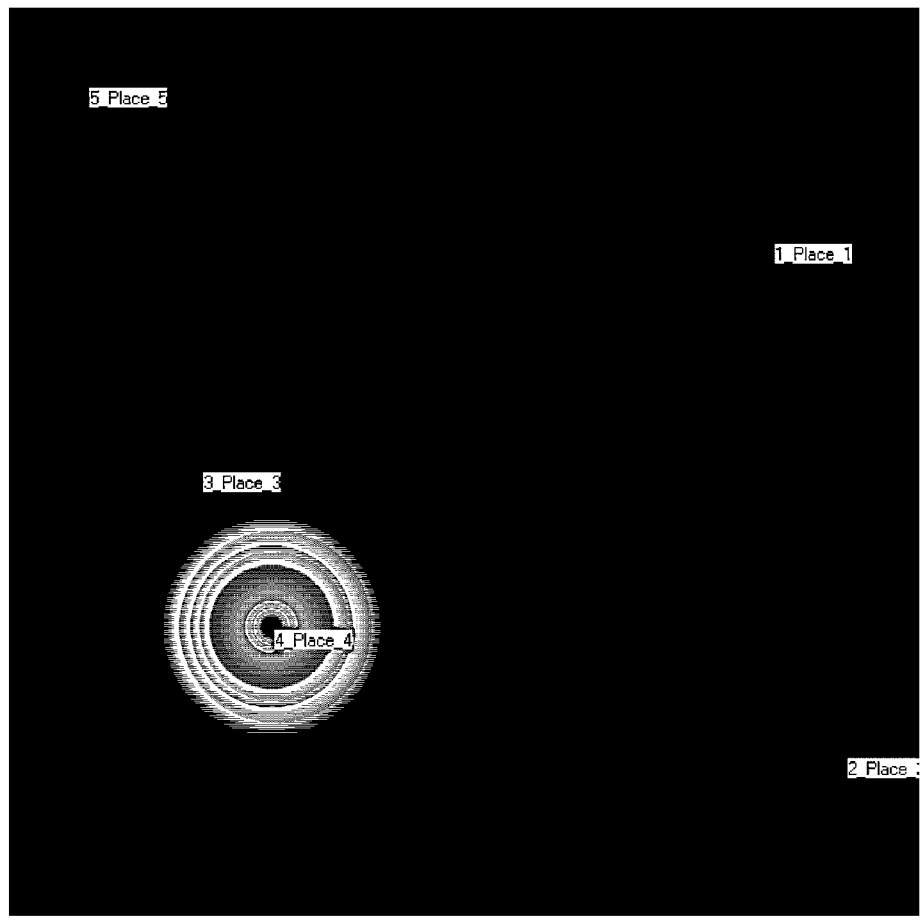
FIG. 12 illustrates the scalar field representation of the causation process for the time step 1.
Figure 13:
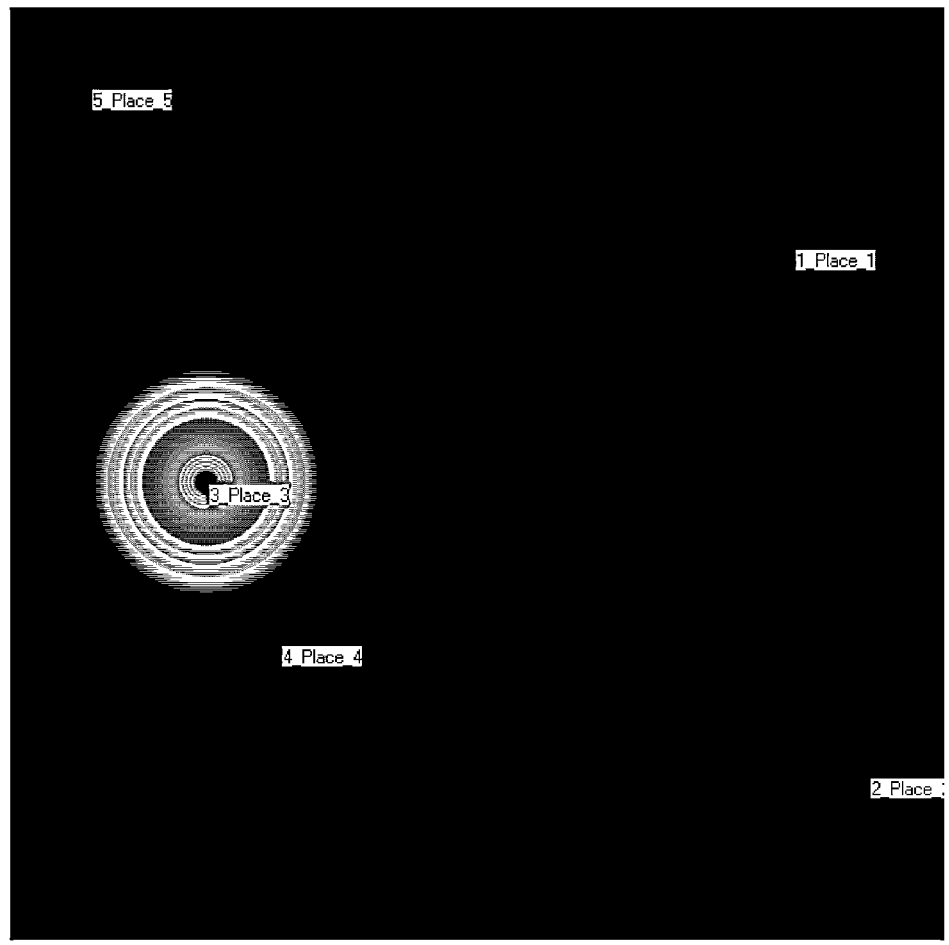
FIG. 13 illustrates the scalar field representation of the causation process for the time step 2.
Figure 14:
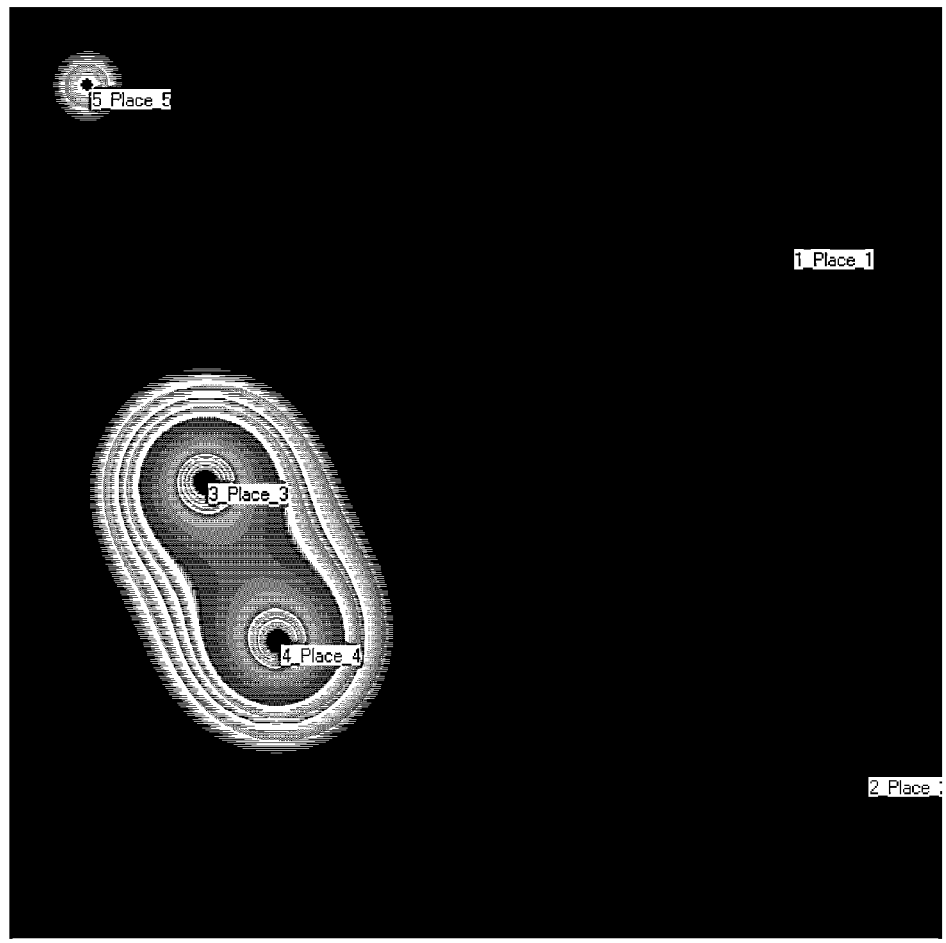
FIG. 14 illustrates the scalar field representation of the causation process for the time step 1 and 2 joined together.

Applying the above equations to the data set of the above described example and represented in the table of FIG. 2, the scalar field computed is represented in the FIGS. 12 to 14.

FIG. 12 represents graphically the scalar field for the first time step from time n=0 to n=1 and FIG. 13 represents graphically the scalar field for the second time step from time n=1 to n=2.

In FIG. 14 the scalar field is illustrated resulting from overlapping the scalar fields of the first and of the second time steps represented in FIGS. 12 and 13.

A further improvement of the method according to the present invention allows to use the output data consisting in the connection matrices for the different time steps for predicting which are the invariants of the process in order to render possible to predict which entities at a certain time (n) will influence which other entities at the time (n+1) without knowing the quantities for the entities at the time (n+1).

FIG. 15 shows a table of the dataset which will be used for carrying out an example of the prediction method steps. This data set is the original dataset used for the previous example and shown in the table of FIG. 2 which is further expanded by adding the quantity for each of the places 1 to 5 for further time instants n=3 and n=4. The sequence of time instants for which the value of the quantity is given is now four time steps.

In relation the dataset of FIG. 15 it has to be noticed that the number of records are few in relation to the records which are too many. The prediction of real/integer number (approximation function) is much harder than to perform a pattern recognition task (classification). For the above reasons, from a statistical viewpoint the dataset is not ideal for building a predictive model from the step of a previous time (n) to a following time (n+1) and the conditions make the prediction model impossible to built up, especially using artificial neural networks.

In order to overcome the above difficulties the present method provides the step of using the connection matrices $C_{i,j}^{[n,n+1]}$ for each time step from time n to time n+1 for generating a new dataset which allows the construction of a predictive model.

The new dataset is generated by the steps of joining and rewriting the data of the connection matrices computed for all of the time steps or for a certain number of time steps with a moving window where each connections vector of each entity Place 1 to Place 5 at the time (n) points out to the connection vector of the same entity (Place 1 to Place 5) at the time (n+1).

These steps may be expressed in a more precise formalism by the following definitions:

$$\text{New Dataset: } \left\{ \left\{ \vec{x}_n^p, \vec{x}_{n+1}^p \right\}_{n=0}^{N-1} \right\}_{p=1}^{P}$$

where:
  P is the number of places where the entities are; and
  N is the number of time steps
According to a particular embodiment the predictive algorithm is an Artificial Neural Network ANN with the following model:

$$x(n) \rightarrow x(n+1) = f(x(n), w^*) + \epsilon$$

where:
  w* the weight matrix of the trained Artificial Neural Network, which approximates the optimal parameters to model the global temporal process obtained by the known connection matrices $C_{i,j}^{[n,n+1]}$ so defining the local laws of the process itself.

Applying the above steps to the dataset of FIG. 15 as illustrated in FIG. 16, the reconstruction steps of the causation process provide four matrices, one for each time step and each matrix being a 5×5 matrix in which the strength of the connections for the source entities (place 1 to Place 5) at step(n) to the destination entities (place 1 to Place 5) at step (n+1) are given and a set of further four connection matrices defining the possible oriented link between the source entities (pace 1 to Place 5) from step (n) to step (n+1).

Figure 17:
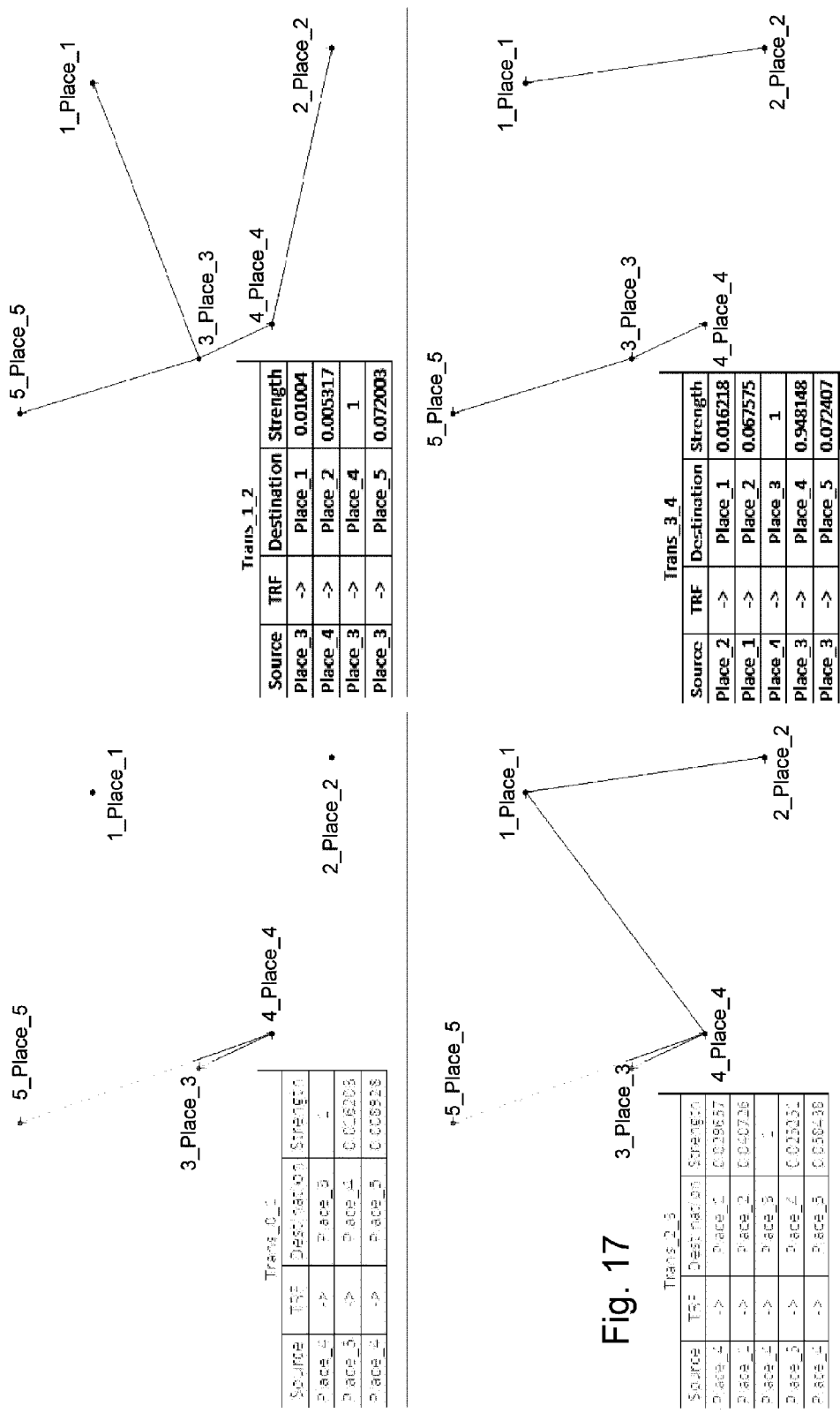
FIG. 17 illustrates for each time step, separately, the causation process table and the relative graphical representation.

FIG. 17 illustrates the results of the causation process for each step (1 to 4) defined as trans 0-1, trans 1-2, trans 2-3 trans 3-4 in a table and in the graphic form as already shown in the previous example of FIGS. 2 to 10.

Applying the joining and rewriting process of the connection matrices for obtaining the new database described above to the connection matrices determined for each time step of the present example, the new dataset obtained is illustrated in FIG. 18.

On the left hand side the braces indicates the part of the records of the dataset which are used for carrying out training, testing of an artificial neural network and a prediction experiment.

With tuning the records are indicated which are used for training an blind testing the trained artificial neural network. The last five records relating to the source entities Place 1 and Place 5 at step n=3 (fourth step) are the records on which the prediction algorithm is used for determining at time (n+1), the connection matrix relating to this time step.

For the Training set and for the Testing set, each record is composed by P+1 input variables:
1. The connectivity (1/0) of each place from the time (n) to the time (n+1), according to the TDM Output;
2. An identification number for each place (an integer). and P target variables:
3. The connectivity (1/0) of each place from the time (n+1) to the time (n+2), according to the TDM Output.

The best condition for the Training and for the Testing set is a situation where none of the patterns has the same input vector but a different target vector. When this situation occurs, the patterns with these features are not trainable or testable. A solution can be to augment the memory window, if the amount of data allows this coding, until every ambiguity disappears. In the other cases, the ANNs will treat these situations as "noise".

In the present example there are some cases of ambiguity, but the data are too few for an augmented Coding.

The training set is composed of 10 patterns: 6 input and 5 target each one;

The testing set is composed of 5 patterns, with the same input-target structure.

An artificial neural network, particularly a so called Sine Net according to document U.S. Pat. No. 7,788,196 is used for training. Its weights are tested in blind way (the ANN will see only the input vector of the 5 patterns) using the testing set. The artificial neural network prediction capability is measured in an experiment in terms of:
1. Sensitivity=Number of real connections correctly predicted,
2. Specificity=Number of real non connections correctly predicted,
3. Accuracy=Number of correct predictions.

The artificial neural network, consequently, will generate 25 (5×5) independent estimations (predictions).

After 43989 epochs the Sine Net artificial neural network, with 24 hidden units, has terminated its training, with no further possibility to reduce its learning error (RMSE=0.21505214).

FIG. 19 illustrates the results of the prediction for each place by comparing the real known connection matrix with the predicted/estimated one by the artificial neural network.

As it is indicated, the light grey areas indicate the results which are missing connection relating to the real known data while the dark grey area the false connection relatively to the real known data.

The table of FIG. 20 indicates the performances of the artificial neural network in terms of sensitivity, specificity and accuracy. As it appears the sensitivity is 60.00%, the specificity is 90.00%, and the accuracy is 84.00%.

Figure 21:
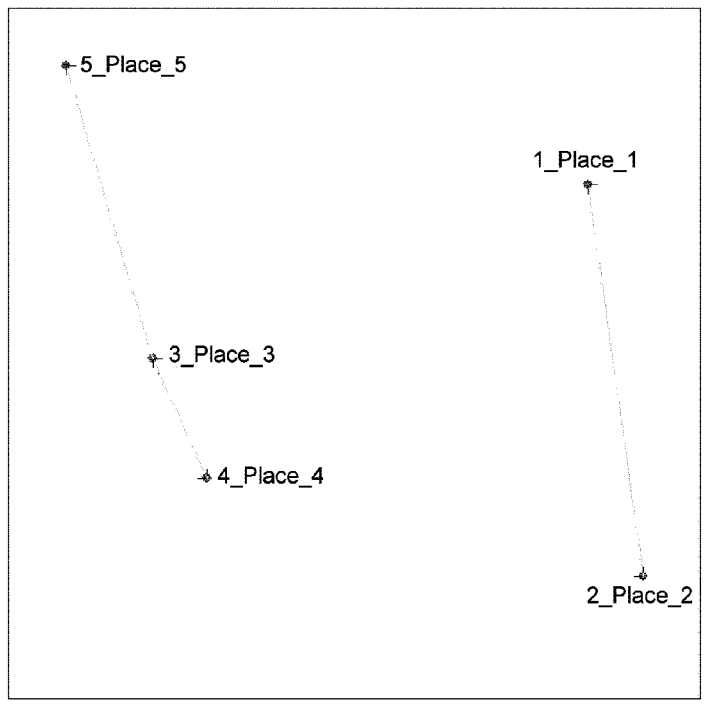
FIGS. 21 and 22 show graphically respectively the real dynamics of the time step subjected to prediction in the experiment and the one obtained by the estimation by means of the artificial neural network.
Figure 22:
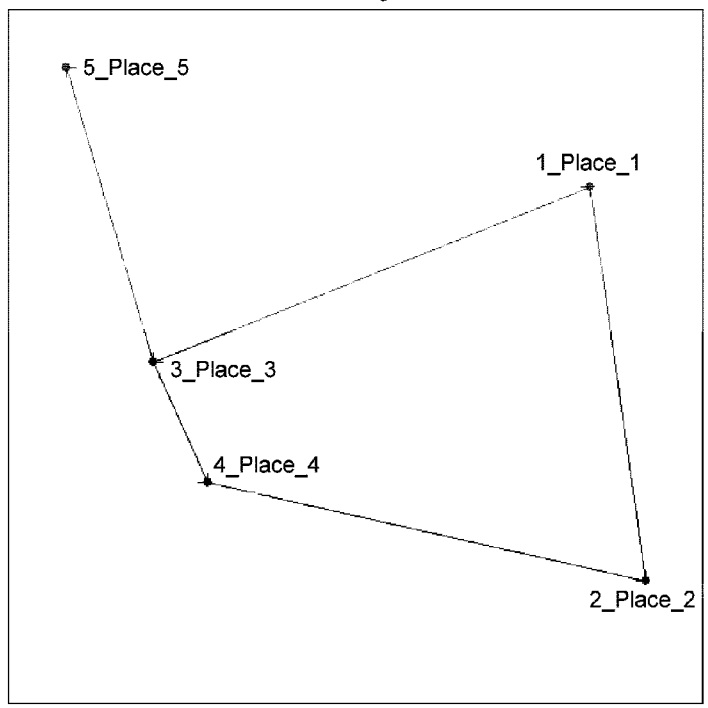

FIGS. 21 and 22 illustrate the graphical representations respectively of the known real dynamics and of the dynamics predicted with the artificial neural network.

In FIGS. 23 to 29 the application of the method according to the present invention to a real case is described.

Figure 23:
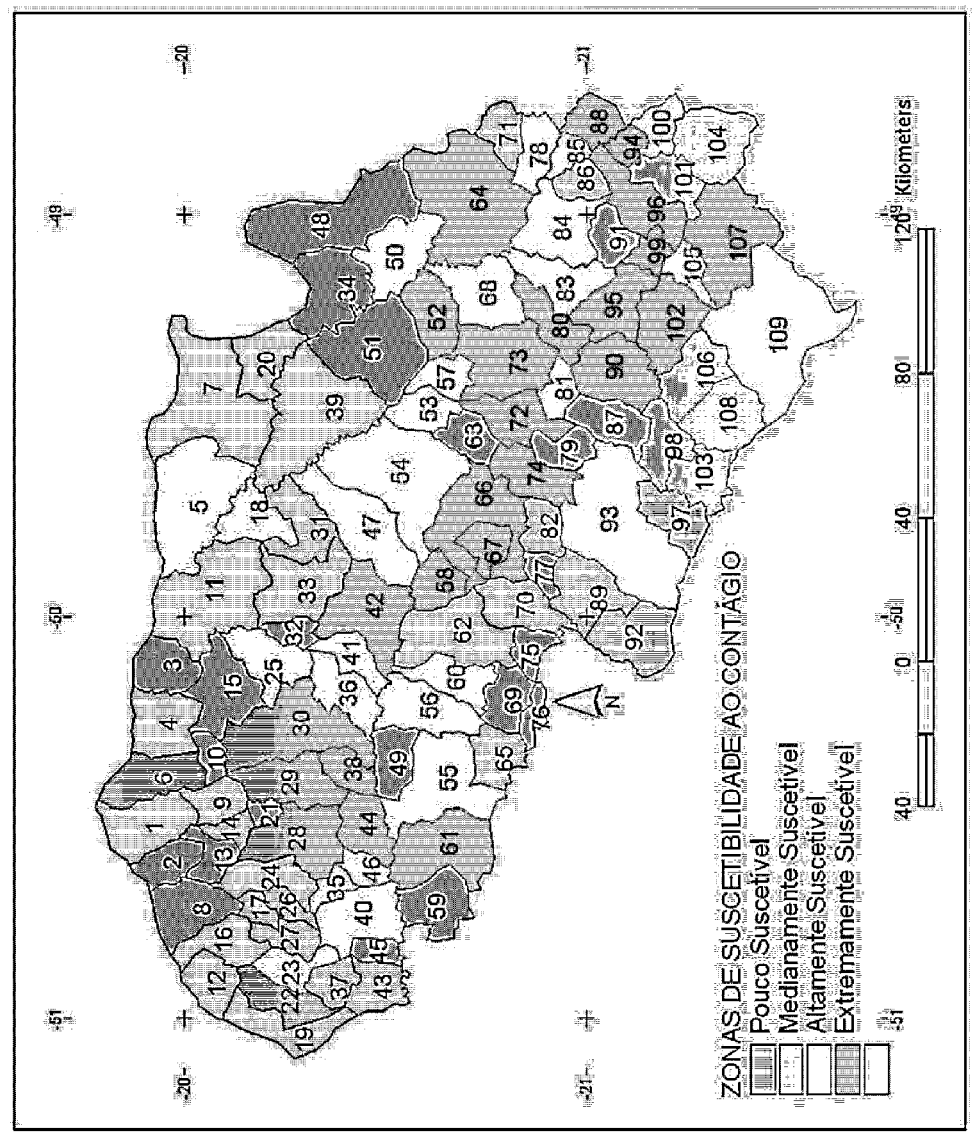
FIG. 23 is a map relating to the diffusion of a disease which is the Deng fewer epidemics in Brazil.

FIG. 23 illustrates the geographical map of the diffusion of the Dengue fever epidemics in Brazil. The map represents a geographical area and the different grey shades of the regions in which the geographical area is subdivided indicate different numbers of infected individuals.

The map has been constructed as a graphical representation of the dataset of table of FIG. 24. This table contains the data about the Dengue fever in seven months in 54 regions. To each of the 54 regions defined by their geographical coordinates the number of new subjects infected at each time step is indicated for six following time steps from time n=0 to n=6, where n is a natural number.

Figure 25:
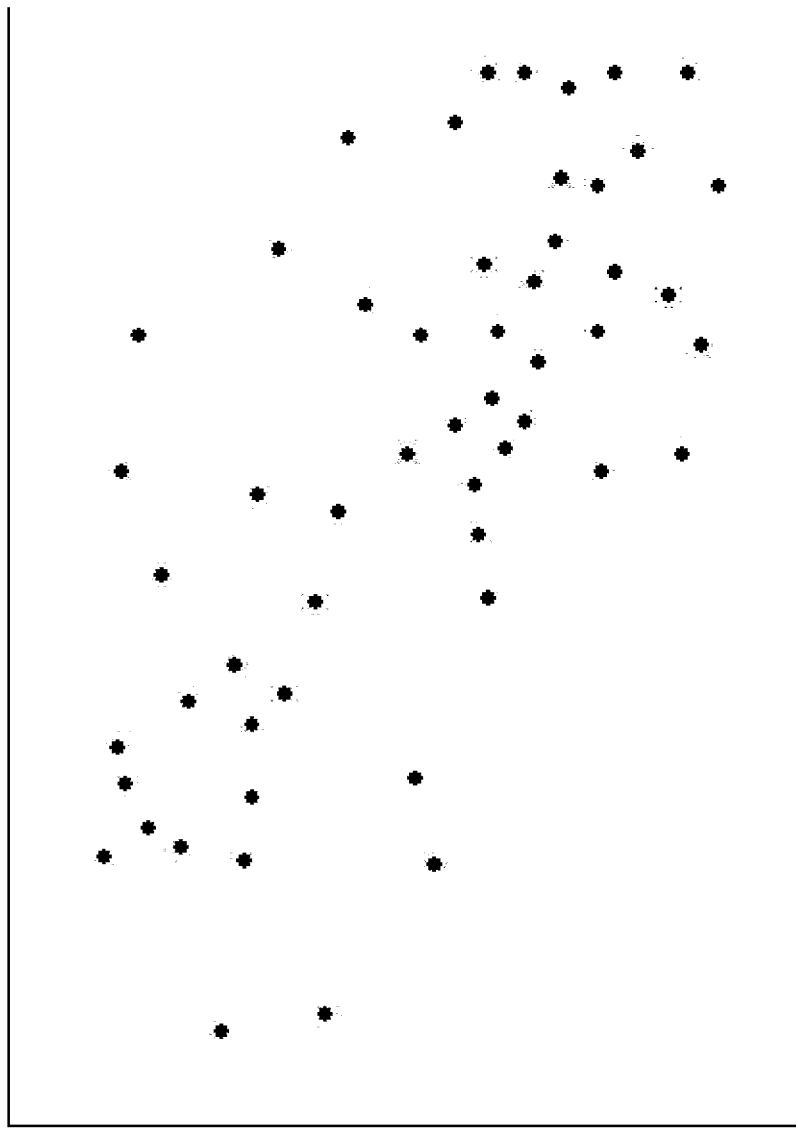
FIG. 25 illustrates the map of the different points representing the different location with the geographical coordinates of the table of FIG. 24.

FIG. 25 illustrates a two dimensional map with the points placed correspondingly to the coordinates of the 54 regions in the dataset of FIG. 24.

Using the method according to the present invention by applying the steps for determining the strength of the matrix of connections and out of the values of the strength of connections, the matrix of connection indicates the link between different regions, for each one of predetermined six time steps.

FIG. 26 illustrates the graphical representations of the connection matrix determined for each of the time steps 1 to 6. The connection matrices of each time step and their graphical representation constructed as in the previous examples described above give information on the causation process of the epidemic diffusion by indicating which place influences which other place at each temporal step provided.

Figures 27, 28:
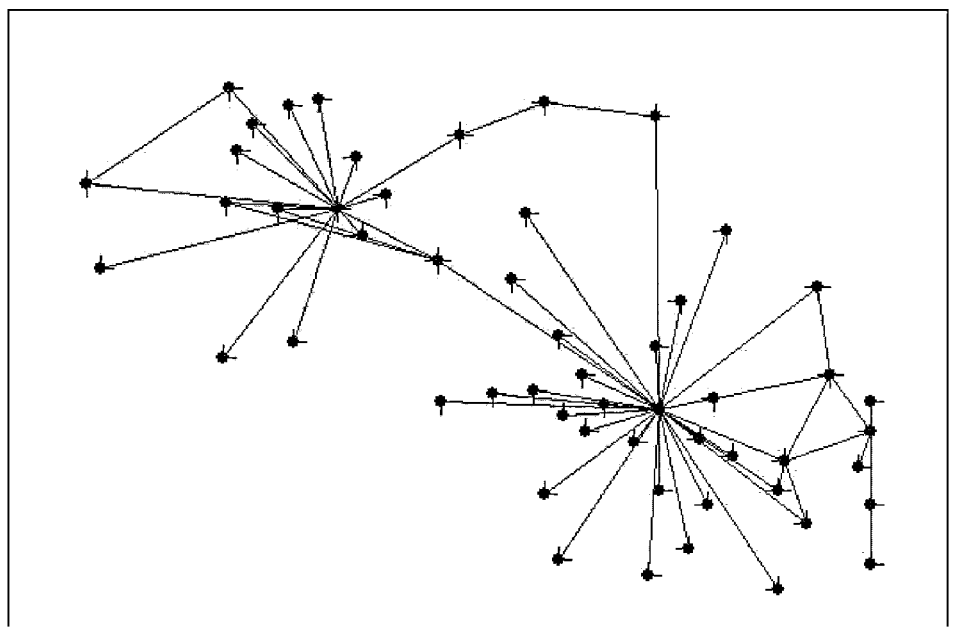
FIG. 27 illustrates the six graphical representations of FIG. 26 overlapped.
FIG. 28 illustrates a table of the comparison of the results of the causation process reconstruction according to the present method in relation to the known real causation process of the Deng fever epidemics.

FIG. 27 represents the six graphical representations of FIG. 26 in overlapped condition, while table of FIG. 28 indicates the performances of the method.

Figure 29:
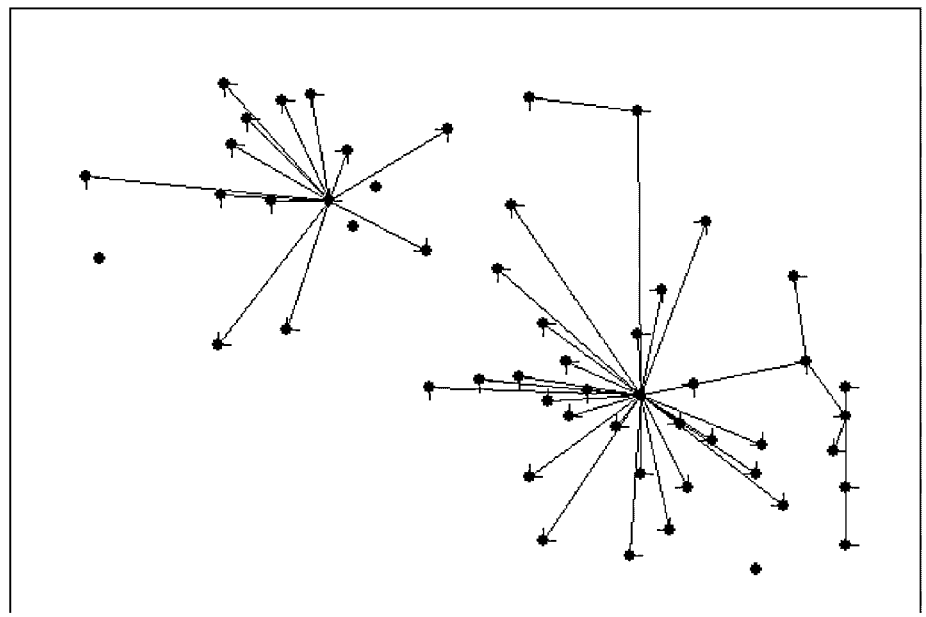
FIGS. 29, 30 and 31 illustrate respectively the results of the prediction by an artificial neural network of the connections and thus the development of the causation roves for three following time steps the first two of which are the fifth and sixth time steps for which the data is known from the Table 24 and the last one of which is a time step for which no data is provided in table of FIG. 24.
Figure 30:
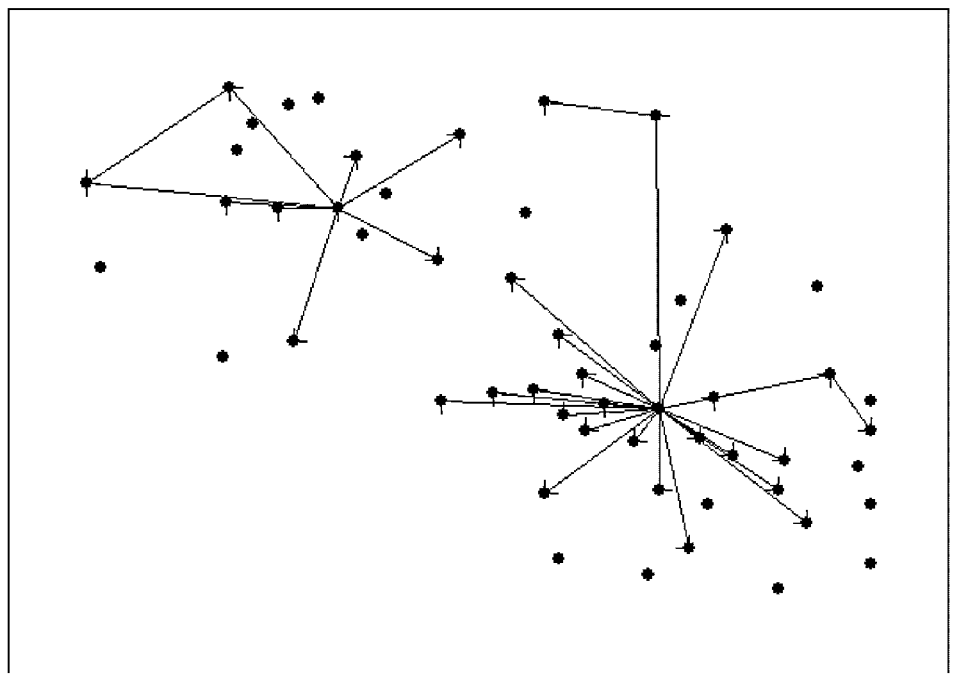
Figure 31:
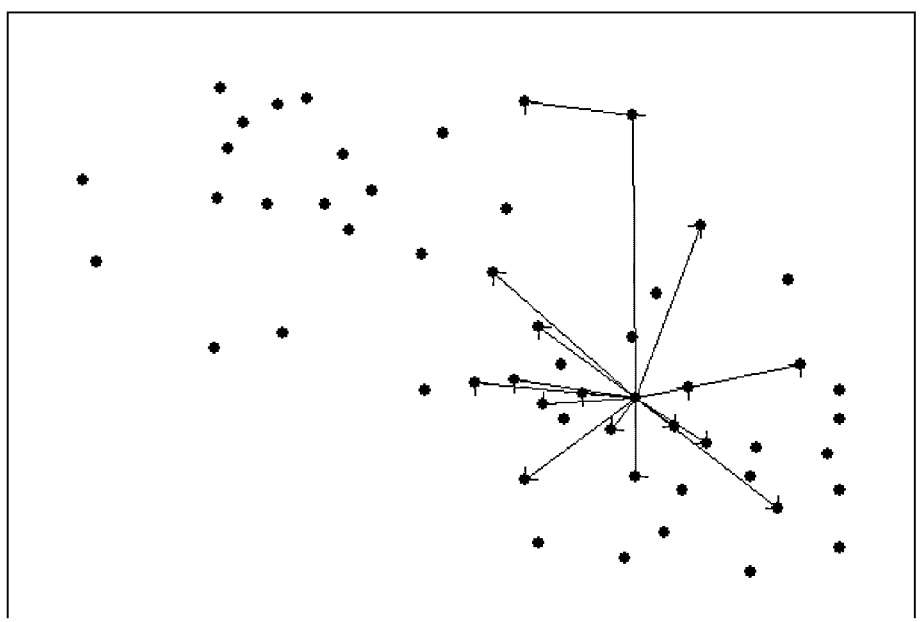

FIGS. 29 to 31 are the results of the prediction steps applied to the present example of the Dengue epidemics.

FIG. 29 shows the performance of the artificial neural network trained with the new dataset constructed from the six connection matrices of FIG. 26 according to the above described generic steps in the process of blind testing. The artificial neural network is trained with the data of the connection matrices of the first four time steps, while blind testing is executed with the data of the fifth step.

In FIG. 30 the table of the performances of the blind testing step of the artificial neural network and the graphical representation of the connection matrix predicted during blind testing are shown. In this case training is carried out by using the data of the connection matrices of five time steps, while blind testing is carried out for the sixth time step.

FIG. 31 is similar to FIGS. 29 and 30. Here the performances and the graphic representation of the prediction are illustrated obtained by blind testing for the data of the seventh time step an artificial neural network trained with the data of the connection matrices of the first six time steps.

All the predicted results have received confirmation by the real data.

The models and methods described herein may be performed on an electronic device such as a computer system having a memory and a processor, and may produce displays on a computer screen or other electronic device that provide graphical representations and enable a user to assess, store or print images, data, or other information.

In addition, instructions and/or data may be stored on a memory and may be accessed through a processor or other electronic device to perform the method and develop and implement the model described herein.

The invention claimed is:

1. A method of reconstructing a causation process from time varying data describing an event,
   wherein the data consist in a certain number of entities each one having a position in a space, and each one of the entities is characterized by at least a quantity or value relatively to at least one feature and in the quantity or value relatively to at least one of the features of the entities at least at two different times or at each time instant of a sequence of time instants;
   the method describing the higher likelihood transition of all entities i, j from the time n to the time n+1 as a function of the position coordinate of the entity I and of the entity j and the quantity of the at least one feature of the entity I and of the entity j at the time n and at the time n+1:

$$M_{i,j}^{[n,n+1]} = \psi(x_i, y_i, q_i^{[n]}, q_i^{[n+1]}, x_j, y_j, q_j^{[n]}, q_j^{[n+1]}).$$

the function determining the strength of the connection between each entity i at time n and each other entity j at time n+1; and the method determining the source causing changes in quantity of the entity j from the time n to the time n+1 as the entity i for which the strength of connection is a maximum.

2. The method according to claim 1, in which the method steps are applied for each step from a time n to a time n+1 of the value of at least one quantity determined at each time instant of a sequence of time instants.

3. The method according to claim 1, in which for each time step from time n to time n+1, a data matrix is generated in which each element is the strength of the connection of each entity i at time n to each entity j at time n+1.

4. The method according to claim 3, in which, from a data matrix of the strength of the connections, a data matrix of the presence of a directed link is generated, in which each element represents the presence value 1 or absence value 0 of a connection between en entity I at time n and an entity j at time n+1, and in which the value 0 or 1 is given by determining the maximum strength among the strength of connection of each one of the entities i and one entity j.

5. The method according to claim 3, in which the strength of the connection between a so called source entity i at time n and a destination or target entity j at time n+1 is determined according to the following function:

$$S_{i,j}^{[n,n+1]} = q_i^{[n]} \cdot q_j^{[n+1]} \cdot e^{-\frac{d_{i,j}}{\alpha}} \cdot \frac{1+(q_i^{[n+1]}-q_i^{[n]})}{1+(q_j^{[n+1]}-q_j^{[n]})} ; q \in [0,1]$$

where:
$q_i^{[n]}$, $q_i^{[n+1]}$ are respectively the quantity in source place (entity i) at time n and the quantity inn source place (entity i) at time n+1;
$q_j^{[n]}$, $q_j^{[n+1]}$ are respectively the quantity in destination place (entity j) at time n and the quantity in destination place (entity j) at time n+1;
$d_{i,j}$ is the distance between the source (entity i) and the destination (entity j) in the space or map;
α is a tuned parameter connected to distance; and
$S_{i,j}^{[n,n+1]}$ is the strength of directed connection between source (entity i) at time n and destination (entity j) at time n+1.

6. The method according to claim 5, in which a matrix of the strength of connection can be constructed from the data of the strength of connection obtained from equation $S_{i,j}^{[n,n+1]}$.

7. The method according to claim 5, in which the selection of the strongest connection for determining which source entity i has caused the changes in the quantity of the destination entity j in the time step from time n to time n+1 is determined as follows from:

$$S_{i,j}^{[n,n+1]}$$

$$S_{Win,j}^{[n,n+1]} = \text{ArgMax}\{S_{i,j}^{[n,n+1]}\}$$

where:
ArgMax is the maximum of the argument of the function $S_{i,j}^{[n,n+1]}$ and $S_{Win,j}^{[n,n+1]}$ determines this maximum among the strength of connection of the source entities i for each different destination entity j; and the entity i for which the strength of connection $S_{i,j}^{[n,n+1]}$ is maximum to a certain entity j is considered as the entity by which the event at entity j determining the changes in the value of the quantity at entity j from time n to time n+1 has been caused.

8. The method according to claim 7, in which from $S_{Win,j}^{[n,n+1]}$ a numerical value of presence/absence of a directed link between a source entity i at time n and a destination entity j at time n+1 can be determined by the following equations:

$$\begin{cases} C_{i,j}^{[n,n+1]} = 1 & i = \text{Win}; \\ C_{i,j}^{[n,n+1]} = 0 & i \neq \text{Win}; \end{cases}.$$

where:
the definition Win relates to the ith entity for which the equation $S_{Win,j}^{[n,n+1]} = \text{ArgMax}\{S_{i,j}^{[n,n+1]}\}$ is valid; and
$C_{i,j}^{[n,n+1]}$ is defined as the function indicating the presence of a link between a source entity I at time n and a destination entity j at time n+1.

9. The method according to claim 8, in which a matrix is generated from the values $C_{i,j}^{[n,n+1]}$, which matrix has values 1 for the elements I, j for which the entity i satisfying the equation $S_{Win,j}^{[n,n+1]} = \text{ArgMax}\{S_{i,j}^{[n,n+1]}\}$ for a destination entity j and zero values for all the entities i for which the equation is not true.

10. The method according to claim 5, in which the results of the equation $$M_{i,j}^{[n,n+1]} = \psi(x_i, y_i, q_i^{[n]}, q_i^{[n+1]}, x_j, y_j, q_j^{[n]}, q_j^{[n+1]}).$$

are extended to the entire map by determining out of the values $S_{i,j}^{[n,n+1]}$ a scalar field.

11. The method according to claim 10, in which the scalar field is given by the potentiality (U) of each point of the surface to influence the other point of the surface of the map and to be influenced is determined by the following equation:

$$U_{k_{x,y}}^{[n,n+1]} = \sum_i^M e^{-\frac{D(E_{i_{x,y}}, P_{k_{x,y}})}{\alpha}} \cdot I_{i_{x,y}}^{[n,n+1]}$$

where
D(.) is the distance of a generic k-th point P from the i-th entity (E) in the map;
M is the number of entities E;
$E_{i_{x,y}}$ is the i-th entity E with the coordinate x, y in the map;
$P_{k_{x,y}}$ is the k-th point P in the map with the coordinate x, y in the map; and $$I_{i_{x,y}}^{[n,n+1]} = \sum_j^M S_{i,j}^{[n,n+1]}.$$

12. A method of predicting the evolution dynamics of an event or process starting from the information about the causation process which comprises the following steps:
providing data which data consist in a certain number of entities each one having a position in a space, and each one of the entities being characterized by at least a quantity or value relatively to at least one feature, the data comprising for each of the entity i, j and for at least one of the features the quantity or value $q_i$ at different time instants n of a sequence of time instants comprising N time steps;

determining for each step from one time instant n to the following time instant n+1 in the sequence of time instants the matrix of the strength of connections $S_{i,j}^{[n,n+1]}$ from a source entity i at time n to a destination entity j at time n+1 and the connection matrix $C_{i,j}^{[n,n+1]}$, i.e. the matrix of absence or presence of a link between a source entity i at time n and a destination entity j at time n+1;

where:

$$S_{i,j}^{[n,n+1]} = q_i^{[n]} \cdot q_j^{[n+1]} \cdot e^{-\frac{d_{i,j}}{\alpha}} \cdot \frac{1 + (q_i^{[n+1]} - q_i^{[n]})}{1 + (q_j^{[n+1]} - q_j^{[n]})}; q \in [0, 1]$$

and where $q_i^{[n]}$, $q_i^{[n+1]}$ are respectively the quantity in source place (entity i) at time n and the quantity inn source place (entity i) at time n+1;

$q_j^{[n]}$, $q_j^{[n+1]}$ are respectively the quantity in destination place (entity j) at time n and the quantity in destination place (entity j) at time n+1;

$d_{i,j}$ is the distance between the source (entity i) and the destination (entity j) in the space or map;

α is a tuned parameter connected to distance;

$S_{i,j}^{[n,n+1]}$ is the strength of directed connection between source (entity i) at time n and destination (entity j) at time n+1;

and where the elements of the connection matrix $C_{i,j}^{[n,n+1]}$ for each time step is determined from the strength of connections $S_{i,j}^{[n,n+1]}$ for each time step according to the following steps from equation $S_{Win,j}^{[n,n+1]} = \text{ArgMax}\{S_{i,j}^{[n,n+1]}\}$ a numerical value of presence/absence of a directed link between a source entity i at time n and a destination entity j at time n+1 is determined by the following equations:

$$\begin{cases} C_{i,j}^{[n,n+1]} = 1 & i = \text{Win}; \\ C_{i,j}^{[n,n+1]} = 0 & i \neq \text{Win}; \end{cases}$$

generating a new dataset by joining the data of the connection matrix $C_{i,j}^{[n,n+1]}$ of all the N time steps of the sequence of time instants;

training a predictive algorithm with at least part of the data of the new dataset; and determining the quality of the entities as source entities i at a first time instant at which the quality or value of the at least one feature is known for destination entities j at a following future time instant by feeding the known data at the first time instant to the trained predictive algorithm.

13. The method according to claim 12, in which the new dataset is generated by joining an rewriting the connection matrices $C_{i,j}^{[n,n+1]}$ with a moving windows where each connection vector x of each place P of the entity at the time n points out to the connection vector x of the same place P at time n+1

$$\text{New Datasset: } \{\{\vec{x}_n^p, \vec{x}_{n+1}^p\}_{n=0}^{N-1}\}_{p=1}^{P}$$

where:

P is the number of places where the entities are; and

N is the number of time steps.

14. The method according to claim 12, in which the predictive algorithm is a Artificial Neural Network ANN with the following model:

$$x(n) \rightarrow x(n+1) = f(x(n), w^*) + \epsilon$$

Where:

$w^*$ is the weight matrix of the trained Artificial Neural Network which approximates the optimal parameters to model the global temporal process obtained by the known connection matrices $C_{i,j}^{[n,n+1]}$ so defining the local laws of the process itself.

15. The method according to claim 14, in which for the training set and the testing set of the artificial neural network each record of the training and testing set from the new database is composed by P+1 input variables consisting in:

the connectivity values (1/0) of each entity from the time (n) to the time (n+1) according to the corresponding connection matrix $C_{i,j}^{[n,n+1]}$, and the connectivity values (1/0) of each entity from the time (n+1) to the time (n+2) according to the corresponding connection matrix $C_{i,j}^{[n+1,n+2]}$, while none of the sets has the same input vector but a different target vector.

* * * * *